United States Patent
Srinivasan et al.

(10) Patent No.: US 12,414,054 B2
(45) Date of Patent: Sep. 9, 2025

(54) SYSTEMS AND METHODS FOR ALLOCATING TRANSMIT POWER AND OPTIONALLY A CHANNEL TO A RADIO REQUESTING AUTHORIZATION TO TRANSMIT IN SHARED SPECTRUM

(71) Applicant: Outdoor Wireless Networks LLC, Claremont, NC (US)

(72) Inventors: Navin Srinivasan, Fairfax, VA (US); Ariful Hannan, Sterling, VA (US)

(73) Assignee: Outdoor Wireless Networks LLC, Richardson, TX (US)

( * ) Notice: Subject to any disclaimer, the term of this patent is extended or adjusted under 35 U.S.C. 154(b) by 355 days.

(21) Appl. No.: 18/193,326

(22) Filed: Mar. 30, 2023

(65) Prior Publication Data

US 2023/0337149 A1 Oct. 19, 2023

Related U.S. Application Data

(60) Provisional application No. 63/337,432, filed on May 2, 2022, provisional application No. 63/331,410, filed on Apr. 15, 2022.

(51) Int. Cl.
H04W 52/34 (2009.01)
H04W 52/36 (2009.01)
H04W 72/0453 (2023.01)

(52) U.S. Cl.
CPC ....... *H04W 52/346* (2013.01); *H04W 52/367* (2013.01); *H04W 72/0453* (2013.01)

(58) Field of Classification Search
CPC ............. H04W 52/346; H04W 52/367; H04W 72/0453
See application file for complete search history.

(56) References Cited

U.S. PATENT DOCUMENTS

| | | | | |
|---|---|---|---|---|
| 12,069,631 | B2 * | 8/2024 | Hannan | H04W 52/367 |
| 2023/0007668 | A1 * | 1/2023 | Al-Mufti | H04W 72/121 |
| 2023/0337149 | A1 * | 10/2023 | Srinivasan | H04W 52/346 |
| 2024/0397494 | A1 * | 11/2024 | Hafeez | H04W 16/14 |
| 2024/0406943 | A1 * | 12/2024 | Yadav | H04W 16/14 |

FOREIGN PATENT DOCUMENTS

WO 2023003614 A1 1/2023

OTHER PUBLICATIONS

WINNF, WINNF-TS-0061, Version V1.5.1, Test and Certification for Citizens Broadband Radio Service (CBRS); Conformance and Performance Test Technical Specification; SAS as Unit Under Test (UUT), Oct. 7, 2019, pp. Cover through 180.

WINNF, "WINNF-TS-0112, Version V1.9.1, Requirements for Commercial Operation in the U.S. 3550-3700 MHz Citizens Broadband Radio Service Band", Mar. 11, 2020, pp. Cover through 76.

* cited by examiner

*Primary Examiner* — Ankur Jain
(74) *Attorney, Agent, or Firm* — Fogg & Powers LLC

(57) ABSTRACT

Techniques are provided for determining a channel at and/or a maximum transmit power level in which the requesting General Authorized Access (GAA) citizens broadband radio service device (CBSD) can transmit prior to the next to be executed coordinated periodic activities among spectrum access systems while diminishing co-channel interference between the requesting GAA CBSD and other GAA CBSD (s) in a neighborhood centered around the requesting GAA CBSD.

15 Claims, 8 Drawing Sheets

SYSTEMS AND METHODS FOR ALLOCATING TRANSMIT POWER AND OPTIONALLY A CHANNEL TO A RADIO REQUESTING AUTHORIZATION TO TRANSMIT IN SHARED SPECTRUM

CROSS-REFERENCE TO RELATED APPLICATIONS

The present application claims benefit of U.S. Patent Application Ser. No. 63/331,410 filed Apr. 15, 2022 and of U.S. Patent Application Ser. No. 63/337,432 filed on May 2, 2022; the entire contents of the aforementioned patent applications are incorporated herein by reference as if set forth in each of their entirety.

BACKGROUND

A citizens broadband radio service (CBRS) includes incumbent users of shared spectrum and secondary users of shared frequency spectrum. Shared frequency spectrum, or shared spectrum, means frequency spectrum in which at least one incumbent user and at least one secondary user are permitted to transmit.

An incumbent user may also be referred to as a primary user or an incumbent. Incumbent users have priority access to transmit in the spectrum shared with respect to the secondary users. An incumbent user may be, for example, naval radar. Such naval radar may intermittently operate in a dynamic protection area (DPA).[1] Alternatively, the incumbent user may be a new fixed satellite service (FSS); typically, an FSS is a static service upon commencement of transmissions.

[1] A DPA is a geographic region in which protection of an incumbent user only occurs when the incumbent user transmits in the geographic region. Optionally, a DPA is a portion of a body of water and the incumbent user is a ship using radar transmitting in the shared spectrum.

When an incumbent user commences transmitting in certain frequency spectrum of the shared spectrum, aggregate interference at the incumbent user or in a region in which the incumbent user may be located must be maintained below an interference threshold. As a result, a secondary user authorized to transmit in the certain frequency spectrum may have to diminish its maximum transmit power or cease transmitting in the certain frequency spectrum. If required to cease transmitting, the secondary user may be permitted to transmit in other frequency spectrum in the shared spectrum not used by the incumbent user.

In CBRS, such secondary users may use citizens broadband radio service device(s) (CBSD(s)). A CBSD is a radio including a transmitter electrically coupled to an antenna. A CBRS system may include at least one spectrum access system (SAS). As a result of calculations made during a periodic Coordinated Periodic Activities among SASs (CPAS), each SAS regulates the transmissions of certain CBSD(s) in the shared spectrum under the SAS's control, e.g., whether each CBSD of a SAS can transmit in the shared spectrum, and if so, then at what power level, to ensure that aggregate interference at incumbent user(s) and/or geographic region(s), is within appropriate interference limits. In CBRS, CPAS is performed periodically, e.g., every twenty-four hours.

In CBRS, a secondary user can either be a Priority Access License (PAL) user and/or a General Authorized Access (GAA) user. Each CBSD can operate as PAL CBSD if the owner of the CBSD owns a PAL license in the geographic area where CBSD is deployed. As a result of calculations made during CPAS, SAS(s) regulate interference from GAA CBSD(s) to a region around one or more PAL CBSD transmitting on the PAL channel. A PAL user means a user who has a license to operate in PAL frequency spectrum in a geographic region (e.g., a county). A PAL CBSD means a CBSD operated by a PAL user. The region around one or more PAL CBSDs using PAL channels is referred to as a PAL protection area (PPA).[2]

[2] Analogous to a PPA, interference must also be regulated within an area known as a grandfathered wireless protection zone (GWPZ). A GWPZ is a geographic area and frequency range in which grandfathered wireless licensees receive protection from CBSD transmission. For CBRS, the PPA is defined by a contour around each PAL CBSD which the PPA protects from interference and in which aggregate interference from GAA CBSDs and PAL CBSDs (outside of the PPA) in each PAL channel of the PAL frequency spectrum must be less than-80 dBm/10 MHz. The PPA may be formed by a union of such contours for nearby PAL CBSDs. The PPA may be defined with protection points which may be equally spaced from one another. The neighborhood of a protection point means a geographic region centered around the protection point. Optionally, the neighborhood is a circle having a radius of 40 km.

A GAA CBSD desiring to transmit in a channel(s) in the shared spectrum transmits, to a SAS which regulates transmissions of the GAA CBSD in the shared spectrum, a grant request seeking authorization to transmit in the channel(s). The GAA CBSD transmitting such a grant request shall be referred to herein as a requesting GAA CBSD or more generally as a requesting CBSD. Pursuant to current laws, regulations, and standards in the United States of America, a SAS is not required to authorize transmission to occur prior to a next Coordinated Periodic Activities among SASs (CPAS) to be executed, e.g., periodically, by the SAS which regulates transmissions of the requesting CBSD.

At least one technique for providing, to the requesting CBSD, authorization to transmit prior to the next to be executed CPAS has been proposed in U.S. Provisional Patent Application 63/224,943 which is entitled CHANNEL RECOMMENDATIONS FOR NETWORK ELEMENTS IN A SHARED SPECTRUM COMMUNICATION NETWORK and was filed on Jul. 23, 2021 (hereinafter "the '943 Patent Application"); the '943 Patent Application is incorporated by reference herein in its entirety. The techniques disclosed in the '943 Patent Application permit a requesting CBSD to commence operations, e.g., transmission, prior to the next to be executed CPAS as long as transmission prior to the next to be execute CPAS does not increase aggregate interference at protection point(s) representing incumbent user(s) beyond acceptable limit(s). Permitting a CBSD to transmit in shared spectrum prior to the next to be executed CPAS makes more efficient use of the shared spectrum.

However, a requesting GAA CBSD may interfere with, and/or suffer interference from, other GAA CBSD(s) controlled by the same and/or different SAS(s). When determining whether to authorize the grant request prior to the next to be executed CPAS, techniques disclosed in the '943 Application do not account for co-channel interference, between the requesting GAA CBSD and other GAA CBSD(s) controlled by the SAS or by other SAS(s), when determining whether to authorize the grant request. As a result, a grant request may be authorized by a SAS that results in co-channel interference between the requesting GAA CBSD and other GAA CBSD(s). Such co-channel interference may detrimentally affect communications between the GAA CBSDs, and user equipment (UE) and/or consumer premise equipment (CPE) with which the GAA CBSDs are meant to be communicatively connected.

SUMMARY OF THE INVENTION

A method is provided. The method comprises: receiving a grant request (a) specifying a channel in shared frequency spectrum and (b) a maximum transmit power level at which a requesting general authorized access (GAA) citizens broadband radio service device (CBSD) desires to transmit in the specified channel, and transmitted by the requesting GAA CBSD; identifying each edge between a non-requesting GAA CBSD and the requesting GAA CBSD, wherein each non-requesting GAA CBSD is geographically located in a neighborhood centered around the requesting GAA CBSD; determining whether there is at least one edge between the requesting GAA CBSD and at least one non-requesting GAA CBSD; determining that there is the at least one edge between the requesting GAA CBSD and the at least one non-requesting GAA CBSD, then determining, for the requesting GAA CBSD, a bandwidth quota; determining whether a total bandwidth (Total BW) assigned to the requesting GAA CBSD is greater than the bandwidth quota, wherein the total bandwidth assigned to the requesting GAA CBSD is a sum of (a) a bandwidth of each channel in which the requesting GAA CBSD is presently authorized to transmit, and (b) a bandwidth of a channel identified in the grant request; determining that the total bandwidth assigned to the requesting GAA CBSD is not greater than the bandwidth quota, then determining (a) a channel, orthogonal or non-orthogonal if no orthogonal channels exist to channels in which each non-requesting GAA CBSD are presently authorized to transmit and/or (b) a maximum transmit power level for a determined channel, and transmitting the determined channel and/or the determined maximum transmit power level to the requesting GAA CBSD; determining whether the requesting GAA CBSD is marked as a recalibrating CBSD, wherein the recalibrating CBSD is a requesting GAA CBSD that has an edge with a former requesting GAA CBSD geographically located in the neighborhood of the requesting CBSD and wherein the former requesting GAA CBSD received authorization to transmit in a channel (a) in the shared frequency spectrum at a time between a prior executed Coordinated Periodic Activities among SASs (CPAS) and a next to be executed CPAS and (a) which overlaps a channel in which the requesting GAA CBSD is authorized to transmit prior to the requesting GAA CBSD transmitting its grant request; determining that the requesting GAA CBSD is not a recalibrating CBSD, then if no free frequency spectrum is available, then diminishing bandwidth allocated to the requesting GAA CBSD to equal the bandwidth quota, or if the free frequency spectrum is available, then, determining and transmitting, to the requesting GAA CBSD, (a) a channel which is in the free frequency spectrum and/or (b) a maximum transmit power level for the determined channel for requested by the requesting GAA CBSD, wherein the free frequency spectrum means frequency spectrum which is orthogonal to frequency spectrum of any incumbent user(s), incumbent region(s), and any non-requesting GAA CBSD(s) which are geographically located in a neighborhood centered around the requesting GAA CBSD; and determining that the requesting GAA CBSD is a recalibrating CBSD, then (i) (a) determining a channel, orthogonal or non-orthogonal if no orthogonal channels exist to channels in which each non-requesting GAA CBSD are presently authorized to transmit, and then diminishing bandwidth in the shared frequency spectrum in which the requesting GAA CBSD is presently authorized to transmit to equal the bandwidth quota, and/or (b) determining a maximum transmit power level for the determined channel, and (ii) transmitting the determined channel and/or the determined maximum transmit power level to the requesting GAA CBSD; wherein the requesting GAA CBSD is configured to transmit using the determined maximum transmit power level and/or the determined channel.

A non-transitory computer readable medium storing a program causing at least one processor to execute a process is provided. The process comprises: receiving a grant request (a) specifying a channel in shared frequency spectrum and (b) a maximum transmit power level at which a requesting general authorized access (GAA) citizens broadband radio service device (CBSD) desires to transmit in the specified channel, and transmitted by the requesting GAA CBSD; identifying each edge between a non-requesting GAA CBSD and the requesting GAA CBSD, wherein each non-requesting GAA CBSD is geographically located in a neighborhood centered around the requesting GAA CBSD; determining whether there is at least one edge between the requesting GAA CBSD and at least one non-requesting GAA CBSD; determining that there is the at least one edge between the requesting GAA CBSD and the at least one non-requesting GAA CBSD, then determining, for the requesting GAA CBSD, a bandwidth quota; determining whether a total bandwidth (Total BW) assigned to the requesting GAA CBSD is greater than the bandwidth quota, wherein the total bandwidth assigned to the requesting GAA CBSD is a sum of (a) a bandwidth of each channel in which the requesting GAA CBSD is presently authorized to transmit, and (b) a bandwidth of a channel identified in the grant request; determining that the total bandwidth assigned to the requesting GAA CBSD is not greater than the bandwidth quota, then determining (a) a channel, orthogonal or non-orthogonal if no orthogonal channels exist to channels in which each non-requesting GAA CBSD are presently authorized to transmit and/or (b) a maximum transmit power level for a determined channel, and transmitting the determined channel and/or the determined maximum transmit power level to the requesting GAA CBSD; determining whether the requesting GAA CBSD is marked as a recalibrating CBSD, wherein the recalibrating CBSD is a requesting GAA CBSD that has an edge with a former requesting GAA CBSD geographically located in the neighborhood of the requesting CBSD and wherein the former requesting GAA CBSD received authorization to transmit in a channel (a) in the shared frequency spectrum at a time between a prior executed Coordinated Periodic Activities among SASs (CPAS) and a next to be executed CPAS and (a) which overlaps a channel in which the requesting GAA CBSD is authorized to transmit prior to the requesting GAA CBSD transmitting its grant request; determining that the requesting GAA CBSD is not a recalibrating CBSD, then if no free frequency spectrum is available, then diminishing bandwidth allocated to the requesting GAA CBSD to equal the bandwidth quota, or if the free frequency spectrum is available, then, determining and transmitting, to the requesting GAA CBSD, (a) a channel which is in the free frequency spectrum and/or (b) a maximum transmit power level for the determined channel for requested by the requesting GAA CBSD, wherein the free frequency spectrum means frequency spectrum which is orthogonal to frequency spectrum of any incumbent user(s), incumbent region(s), and any non-requesting GAA CBSD(s) which are geographically located in a neighborhood centered around the requesting GAA CBSD; and determining that the requesting GAA CBSD is a recalibrating CBSD, then (i) (a) determining a channel, orthogonal or non-orthogonal if no orthogonal channels exist to channels in which each non-requesting GAA CBSD are presently authorized to transmit, and then diminishing bandwidth in the shared frequency spectrum in which the requesting GAA CBSD is presently authorized to transmit to equal the bandwidth quota, and/or (b) determining a maximum transmit power level for the determined channel, and (ii) transmitting the determined channel and/or the determined maximum transmit power level to the requesting GAA CBSD; wherein the requesting GAA CBSD is configured to transmit using the determined maximum transmit power level and/or the determined channel.

An apparatus, comprising: processing circuitry configured to: receive a grant request (a) specifying a channel in shared frequency spectrum and (b) a maximum transmit power level at which a requesting general authorized access (GAA) citizens broadband radio service device (CBSD) desires to transmit in the specified channel, and transmitted by the requesting GAA CBSD; identify each edge between a non-requesting GAA CBSD and the requesting GAA CBSD, wherein each non-requesting GAA CBSD is geographically located in a neighborhood centered around the requesting GAA CBSD; determine whether there is at least one edge between the requesting GAA CBSD and at least one non-requesting GAA CBSD; determine that there is the at least one edge between the requesting GAA CBSD and the at least one non-requesting GAA CBSD, then determine, for the requesting GAA CBSD, a bandwidth quota; determine whether a total bandwidth (Total BW) assigned to the requesting GAA CBSD is greater than the bandwidth quota, wherein the total bandwidth assigned to the requesting GAA CBSD is a sum of (a) a bandwidth of each channel in which the requesting GAA CBSD is presently authorized to transmit, and (b) a bandwidth of a channel identified in the grant request; determine that the total bandwidth assigned to the requesting GAA CBSD is not greater than the bandwidth quota, then determine (a) a channel, orthogonal or non-orthogonal if no orthogonal channels exist to channels in which each non-requesting GAA CBSD are presently authorized to transmit and/or (b) a maximum transmit power level for a determined channel, and transmit the determined channel and/or the determined maximum transmit power level to the requesting GAA CBSD; determine whether the requesting GAA CBSD is marked as a recalibrating CBSD, wherein the recalibrating CBSD is a requesting GAA CBSD that has an edge with a former requesting GAA CBSD geographically located in the neighborhood of the requesting CBSD and wherein the former requesting GAA CBSD received authorization to transmit in a channel (a) in the shared frequency spectrum at a time between a prior executed Coordinated Periodic Activities among SASs (CPAS) and a next to be executed CPAS and (a) which overlaps a channel in which the requesting GAA CBSD is authorized to transmit prior to the requesting GAA CBSD transmitting its grant request; determine that the requesting GAA CBSD is not a recalibrating CBSD, then if no free frequency spectrum is available, then diminish bandwidth allocated to the requesting GAA CBSD to equal the bandwidth quota, or if the free frequency spectrum is available, then, determine and transmit, to the requesting GAA CBSD, (a) a channel which is in the free frequency spectrum and/or (b) a maximum transmit power level for the determined channel for requested by the requesting GAA CBSD, wherein the free frequency spectrum means frequency spectrum which is orthogonal to frequency spectrum of any incumbent user(s), incumbent region(s), and any non-requesting GAA CBSD(s) which are geographically located in a neighborhood centered around the requesting GAA CBSD; and determine that the requesting GAA CBSD is a recalibrating CBSD, then (i) (a) determine a channel, orthogonal or non-orthogonal if no orthogonal channels exist to channels in which each non-requesting GAA CBSD are presently authorized to transmit, and then diminish bandwidth in the shared frequency spectrum in which the requesting GAA CBSD is presently authorized to transmit to equal the bandwidth quota, and/or (b) determine a maximum transmit power level for the determined channel, and (ii) transmit the determined channel and/or the determined maximum transmit power level to the requesting GAA CBSD; wherein the requesting GAA CBSD is configured to transmit using the determined maximum transmit power level and/or the determined channel.

BRIEF DESCRIPTION OF THE DRAWINGS

Comprehension of embodiments of the invention is facilitated by reading the following detailed description in conjunction with the annexed drawings, in which.

DETAILED DESCRIPTION

Figure 1A:
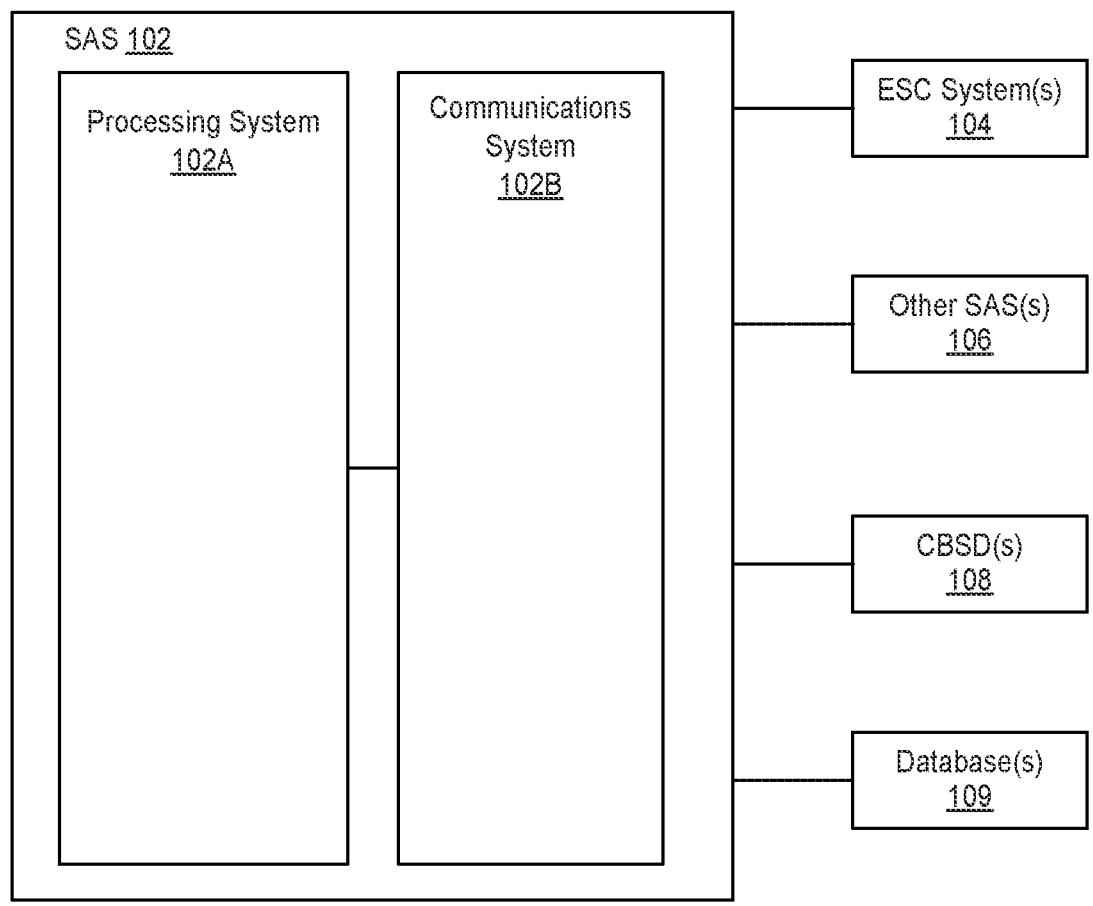
FIG. 1A illustrates a block diagram of one embodiment of a shared spectrum system configured to permit a requesting GAA CBSD to transmit in shared spectrum prior to a next to be executed CPAS whilst diminishing co-channel between the requesting GAA CBSD and other GAA CBSD(s)

Embodiments of the invention implement techniques for determining a channel at and/or a maximum transmit power level in which the requesting GAA CBSD can transmit prior to the next to be executed CPAS while diminishing co-channel interference between the requesting GAA CBSD and other GAA CBSD(s) in a neighborhood centered around the requesting CBSD. If a bandwidth of frequency spectrum authorized for transmission by the requesting GAA CBSD exceeds a bandwidth quota, the bandwidth is diminished to equal the bandwidth quota.

Although embodiments of the invention are applicable to and may be exemplified in the context of CBRS for pedagogical purposes, the embodiments are applicable to other shared spectrum systems, such as for example licensed spectrum access systems or authorized access systems. The invention can be subsequently described in more general terms, e.g., using the term radio rather than CBSD, and shared spectrum system rather than CBRS. Thus, a CBSD may be more generally referred to as a radio. Radio means a radio whose transmission is controlled or regulated by a spectrum access system. However, the terms CBRS and CBSD may be subsequently used when illustrating such a system and a device, or their specifications.

Shared spectrum (or shared frequency spectrum) means frequency spectrum utilized by: (a) incumbent user(s) (e.g., a receiver of a fixed satellite service) and/or geographic region(s) to be maintained interference free (e.g., a grandfather wireless protection zone (GWPZ) or priority access license (PAL) protection area (PPA), a geographic location of an environmental sensing capability (ESC) system receiver(s) and/or an exclusion zone) and (b) at least one of priority access licensee (PAL) CBSD(s) and GAA CBSD(s). The CBSD may be a GAA or a priority access license (PAL) CBSD. Optionally, threshold levels mentioned herein may be set by a system designer and/or a system user. A protection point means a point representing actual and/or potential incumbent user(s) and/or geographic region(s) which are to remain free of interference (as that term is defined herein) from CBSDs. An incumbent region (or incumbent geographic region) means a geographic region which is to remain free of interference (as that term is defined herein), e.g., a PPA, a DPA or a GWPZ.

Frequency spectrum, or each portion thereof, associated with a protection point means frequency spectrum that must be free of interference (as that term is elsewhere defined herein) at the geographic location of the protection point; optionally, such frequency spectrum corresponds to frequency spectrum protected from interference, e.g., utilized by a receiver of an incumbent user or a PAL CBSD.

A neighborhood means a geographic area centered around a point, e.g., a protection point or a geographic location of a CBSD, e.g., the requesting CBSD. Optionally, the neighborhood may have a circular periphery defined by a radius. The dimensions, e.g., radius, of a neighborhood may be different for a protection point and a geographic location of the CBSD. The dimensions, e.g., the radius, of a neighborhood may vary based upon type of protection point or type of CBSD, e.g., category or maximum transmission power of the CBSD.

Frequency spectrum, or channel, means a bandwidth centered about a center frequency. Unless otherwise indicated herein, power as used herein means power or power spectral density. Power levels for a shared spectrum system, such as a CBRS, are often characterized in terms of power spectral density levels. Optionally, power or power spectral density may be a level radiated by antenna(s) electrically coupled to a transmitter of a CBSD and characterized in terms of effective isotropic radiated power (EIRP). Maximum transmit power (or maximum transmit power level) means a maximum power level that the CBSD can transmit while ensuring that a corresponding aggregate interference level, e.g., at a protection point representing of an incumbent user or a geographic region to be maintained interference free, remains at or below a permissible interference threshold level (or protection point interference threshold level), e.g., specified by law, regulation, and/or specification.

Free of interference as used herein does not mean an absence of interference, but rather means an acceptable level of interference (i.e., a level of interference below a threshold level of interference) which may be no interference or a finite level of interference; thus, to determine if a geographic location, e.g., of an incumbent user or a geographic region to be maintained interference free, is free of interference, whether the interference level is below the acceptable level of interference (or a threshold interference) is determined. The acceptable level of interference may vary by the type of incumbent user or geographic region, frequency spectrum, and/or other indicia.

GAA CBSDs may be of at least two types: category A (low transmission power) and category B (high transmission power). Category A has a maximum transmission power spectral density of 30 dBm/10 MHz. Category B has a maximum transmission power spectral density of 47 dBm/10 MHz.

FIG. 1A illustrates a block diagram of one embodiment of a shared spectrum system 100 configured to permit a requesting GAA CBSD to transmit in shared spectrum prior to a next to be executed CPAS whilst diminishing co-channel between the requesting GAA CBSD and other GAA CBSD(s). Thus, the shared spectrum system 100 comprises a SAS 102 configured to more efficiently and more accurately determine maximum transmit power allocated to CBSD(s) within a neighborhood centered around each protection point of the PPA. Each CBSD may be operated by a general authorized access user and/or a priority access licensee.

Optionally, the SAS 102 is coupled to at least one environmental sensing capability system (ESC system(s)) 104. An ESC system is another type of incumbent user. Optionally, the SAS 102 is coupled to at least one database (database(s)) 109, e.g., which has information about (a) incumbent user(s) and/or (b) geographic region(s) (including geographic location(s)) to be maintained interference free (e.g., type, interference threshold power level, location, information about neighborhood, and/or when certain incumbent user(s) and/or geographic regions(s) to be maintained interference free are scheduled to receive in the shared spectrum or to include a communications system, e.g., a radar, that will receive in the shared spectrum. One or more of the database(s) 109 may comprise terrain elevation for geographic region(s), e.g., in which CBSD(s) are located; one or more of the database(s) 109 may comprise morphology type data (e.g., rural, water, urban, and suburban) for such geographic region(s).

Optionally, the SAS 102 is coupled to at least one other SAS (other SAS(s)) 106. The other SAS(s) 106 are configured to control the transmissions of other CBSD(s) (in the same shared spectrum in which the CBSD(s) 108 transmit or in overlapping frequency spectrum) and where the other CBSD(s) are geographically proximate to the CBSD(s) 108. For example, such other CBSDs controlled by other SAS(s) 106 may include PAL and GAA users. A PAL user and/or a GAA user may be a network operator such as a mobile network operator which provides communications services to mobile communications devices, e.g., cell phones, and/or a fixed network operator which provide communications to fixed communications devices, e.g., to provide broadband services to homes and/or businesses.

The SAS 102 is configured to perform interference analysis and authorize transmission by CBSD(s) 108 in the shared spectrum. The SAS 102 is configured to determine a maximum transmission power level for a set of the CBSD(s) 108 which it has authorized to transmit in the shared spectrum. Thus, transmission of each of the CBSD(s) 108 is controlled by the SAS 102. Authorized means that a CBSD, e.g., a GAA CBSD, has received permission, e.g., from a SAS, to transmit in at least one channel of the shared spectrum.

CBSD(s) (whose transmissions are controlled by other SAS(s) 106) may generate electromagnetic energy that overlaps the geographic region and frequency spectrum of the CBSD(s) 108 controlled by SAS 102, and thus must be accounted for by the SAS 102 when the SAS 102 performs interference analysis and authorizes transmission by CBSD(s) 108 in the shared spectrum. The CBSD(s) 108 of the shared spectrum system 100 may generate electromagnetic energy that overlaps the geographic region(s) comprising CBSD(s) whose transmissions are controlled by the other SAS(s) 106, and thus must be accounted for by the other SAS(s) 106 when the other SAS(s) 106 perform interference analysis and authorize operation of PALs and GAA CBSDs (whose transmissions are controlled by the other SAS(s) 106). By coupling SASs whose CBSDs are geographically proximate to one another, each SAS can account for electromagnetic energy emitted from proximate CBSD(s) in those geographic region(s).

Each ESC system detects, and communicates to the SAS 102, the dynamic presence of signal(s), e.g., from some incumbent user(s), such as radars. Alternatively, incumbent users can inform the SAS 102 that they are operating, e.g., by transmitting a signal beacon, or communicating with the database(s) 109 which may be coupled to the SAS 102.

The SAS 102 is also configured to control the operation (e.g., power levels and frequencies of operation) of the GAA user(s)' CBSD(s) so that the PAL CBSD(s) operate free of interference. In one embodiment, the SAS 102 includes a processing system 102A coupled to an optional communications system 102B. The processing system 102A controls the operation, e.g., transmission time period and maximum transmit power level for each of the CBSD(s) 108 that form part of the shared spectrum system 100, and may be configured to execute one or more of the methods described herein. The processing system 102A may be further configured to store data, e.g., describing neighborhoods, e.g., of GAA CBSD(s), threshold level(s), and other data described herein.

The optional communications system 102B facilitates communications between the SAS 102 and other systems or devices, e.g., the CBSD(s) 108, the ESC system(s) 104, the database(s) 109, and/or the other SAS(s) 106. In one embodiment, the optional communications system 102B includes a modem, e.g., an Internet data modem, a transceiver, and/or any other communications device(s) that can facilitate communications between the aforementioned devices.

Optionally, the processing system (or processing system circuitry) 102A may be a state machine, a neural network, and/or a quantum computer. If the processing system 102A includes a state machine, then optionally the state machine may comprise processor circuitry coupled to memory circuitry.

Figure 1B:
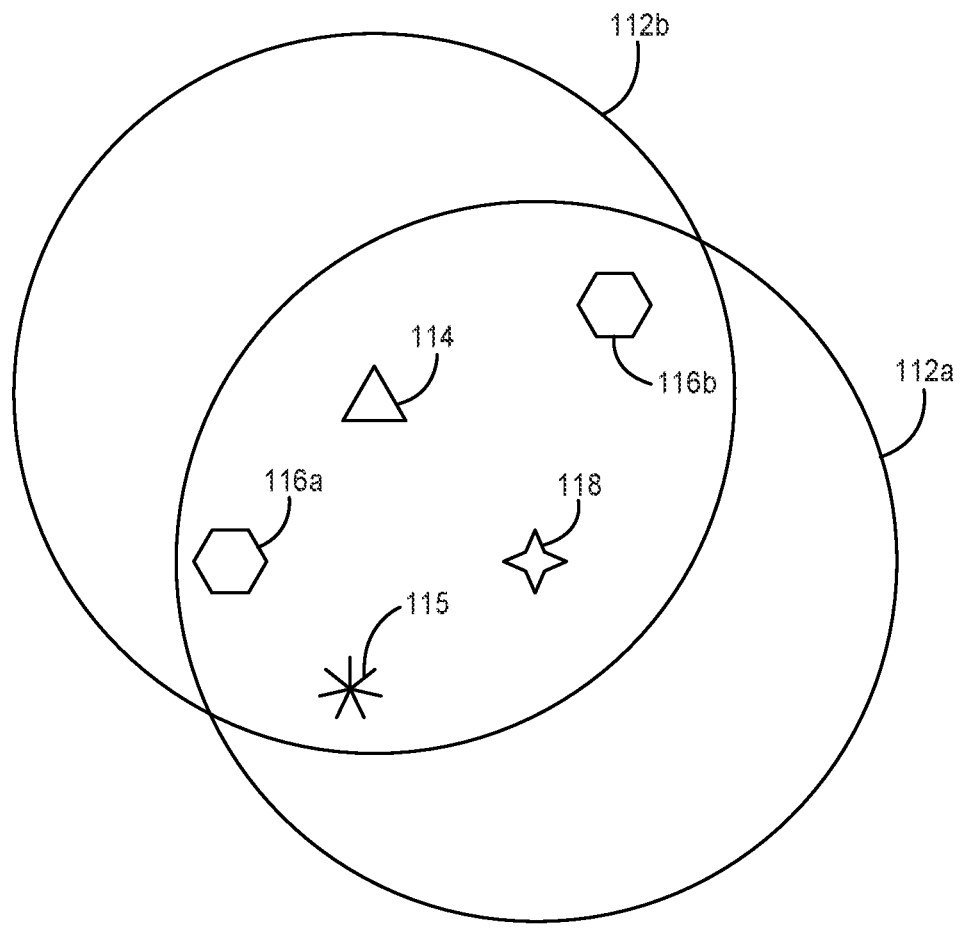
FIG. 1B illustrates a plan view of one embodiment of a neighborhood centered around a requesting GAA CBSD.

FIG. 1B illustrates a plan view of one embodiment of a second neighborhood 112b centered around a requesting GAA CBSD 114 (or a geographic location of the requesting GAA CBSD 114). A first non-requesting GAA CBSD 116a, a second non-requesting GAA CBSD 116b, and a PAL CBSD 115 are geographically located within the second neighborhood 112b centered around the requesting GAA CBSD 114. A protection point 118 of an incumbent user is also located within the second neighborhood 112b centered around the requesting GAA CBSD 114. The requesting GAA CBSD 114, the first non-requesting GAA CBSD 116a, the second non-requesting GAA CBSD 116b, and the PAL CBSD 115 are geographically located within the first neighborhood 112a centered around the protection point 118. These terms will be subsequently explicated.

Figure 2:
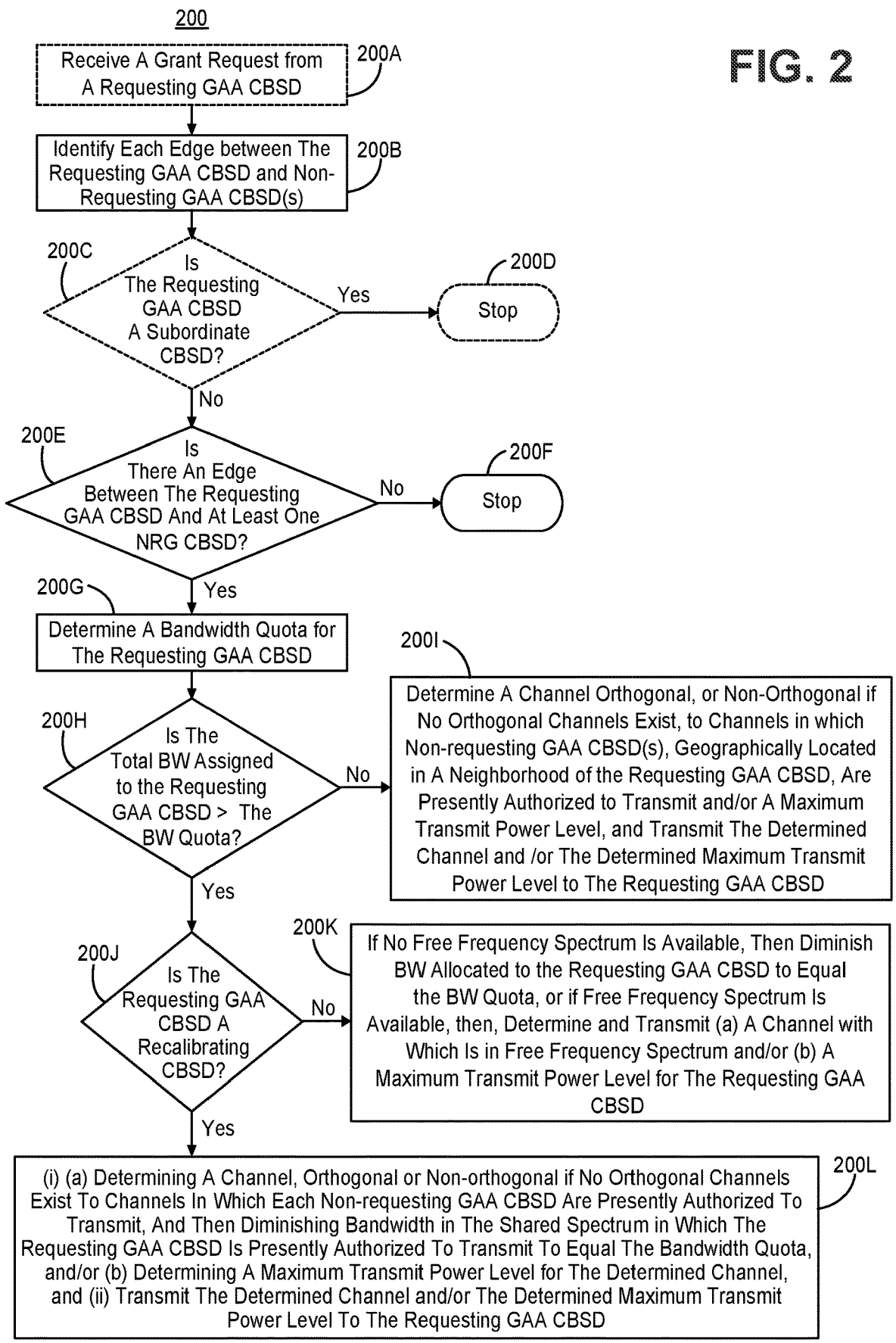
FIG. 2 illustrates a flow diagram of one embodiment of a method for determining a channel and/or a maximum transmit level in which the requesting CBSD can transmit prior to the next to be executed CPAS while diminishing co-channel interference between the requesting CBSD and other CBSD(s) in a neighborhood centered around the requesting CBSD.

FIG. 2 illustrates a flow diagram of one embodiment of a method 200 for determining a channel at and/or a maximum transmit level in which the requesting CBSD can transmit prior to the next to be executed CPAS while diminishing co-channel interference between the requesting CBSD and other (non-requesting) CBSD(s) in a neighborhood centered around the requesting CBSD. To the extent that the methods shown in any Figures are described herein as being implemented with any of the systems illustrated herein, it is to be understood that other embodiments can be implemented in other ways. Optionally, method 200 may be implemented by a SAS 102, e.g., by the processing system 102A; method 200 is illustrated for pedagogical purpose as being implemented by a SAS 102. The requesting CBSD is one of the CBSD(s) 108 described elsewhere herein. The other GAA CBSD(s) may be one of the CBSD(s) 108 and/or CBSD(s) whose transmission controlled by one or more of the other SAS(s) 106.

The blocks of the flow diagrams herein have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

Optionally, in block 200A, a grant request is received from a requesting GAA CBSD. The grant request comprises or specifies (a) a channel in the shared spectrum identified by the requesting GAA CBSD and in which the requesting GAA CBSD requests to transmit, and (b) a maximum transmit power level at which the requesting GAA CBSD desires to transmit in the specified channel. Embodiments of the invention may be implemented in response to a grant request or a spectrum inquiry. For pedagogical purposes, the invention is described in context of a grant request.

In block 200B, each edge, between the requesting GAA CBSD and each non-requesting GAA CBSD within a neighborhood centered around the geographic location of the requesting GAA CBSD, is identified. Optionally, block 200B may be implemented by determining an adjacency vector. The adjacency vector means a 1 by b matrix, where b is a number of non-requesting GAA CBSD(s) in a neighborhood centered around the requesting GAA CBSD. Optionally, when the neighborhood is a circular geographic region, the radius (extending from the geographic location of the requesting GAA CBSD) of the neighborhood is between 15 km and 20 km. A non-requesting GAA CBSD means a GAA CBSD that is not the requesting GAA CBSD. Each vector element is a logical indication, e.g., true or false, whether an interference level between a non-requesting GAA CBSD, corresponding to the vector element, and the requesting GAA CBSD, exceeds a CBSD interference threshold level, and thus whether each GAA CBSD would cause co-channel interference with the other GAA CBSD. If the interference level between the non-requesting GAA CBSD, corresponding to the vector element, and the requesting GAA CBSD, exceeds the CBSD interference threshold level, then an edge exists between the non-requesting GAA CBSD, corresponding to the vector element, and the requesting GAA CBSD. Optionally, interference levels may be determined using propagation models which are a function of (a) a distance between the requesting GAA CBSD and a corresponding non-requesting GAA CBSD and (b) an intervening terrain morphology between the requesting GAA CBSD and the corresponding non-requesting GAA CBSD. An example of how interference levels may be determined is described with respect to the iterative allocation process (IAP) per requirements for IAP set forth in specified in Requirements for Commercial Operation in the U.S. 3550-3700 MHz Citizens Broadband Radio Service Band, WInnForum Standard Document WINNF-TS-0112, version V. 1.9.1, dated Mar. 11, 2020 ("WINNF-TS-0112") which is hereby incorporated by reference herein in its entirety based on distance between GAA CBSDs and terrain morphology.

After block 200B, proceed to block 200E or optionally to block 200C. Optionally, in block 200C, whether the requesting GAA CBSD is a subordinate CBSD is determined. A subordinate CBSD means a GAA CBSD whose channel is selected based upon a channel of another GAA CBSD. Optionally, the subordinate CBSD may be a fixed wireless access (FWA) CPE configured to communicate with a FWA base station which is also a CBSD; when using time domain duplexing, the FWA CPE must operate, e.g., transmit, on the same channel used by the FWA base station.

If the requesting GAA CBSD is a subordinate CBSD, then optionally proceed to optional block 200D. In optional block 200D, (a) stop or (b) determine a maximum transmit power level (for the channel requested by the requesting GAA CBSD) using techniques described in the '943 Patent Application, and transmit, e.g., in a heartbeat message, the determined maximum transmit power level to the requesting GAA CBSD. If the requesting GAA CBSD is not a subordinate CBSD, then proceed to block 200E. Upon the GAA CBSD's receipt of a channel and/or a maximum transmit power described with respect to the various techniques disclose or referred to herein, the requesting GAA CBSD is configured to transmit at a power level less than or equal to the maximum transmit power level, and/or transmit in the channel, received, e.g., from the SAS.

In block 200E, whether there is an edge between the requesting GAA CBSD and at least one non-requesting GAA CBSD (in the neighborhood centered around the requesting GAA CBSD) (NRG CBSD) is determined using the adjacency vector. An edge between the requesting CBSD and an NRG CBSD means that that an interference metric between the NRG CBSD and the requesting CBSD. Optionally, the interference metric may be whether (a) an interference level between the NRG CBSD and the requesting CBSD (i.e., at the NRG CBSD from the requesting CBSD or at the requesting CBSD from the NRG CBSD, exceeds the CBSD interference threshold level, e.g., −96 dBm/10 MHz or (b) a percentage of overlap of areas of a radiation pattern contour of the NRG CBSD and of a radiation pattern contour of the requesting CBSD, wherein a periphery of each contour has a fixed power level, −96 dBm/10 MHz.

If there is not an edge between the requesting GAA CBSD and at least one NRG CBSD, then in block 200F (a) stop or (b) determine a channel and/or a maximum transmit power level using techniques described in the '943 Patent Application, and transmit an authorization, e.g., in a heartbeat message, the determined channel and/or the determined maximum transmit power level to the requesting GAA CBSD. Thus, in (b) above, the maximum transmit power level is determined for the channel requested in the grant request by the requesting GAA CBSD or another channel available for use by the requesting GAA CBSD. If there is an edge between the requesting GAA CBSD and at least one NRG CBSD, then proceed to block 200G.

Figure 3:
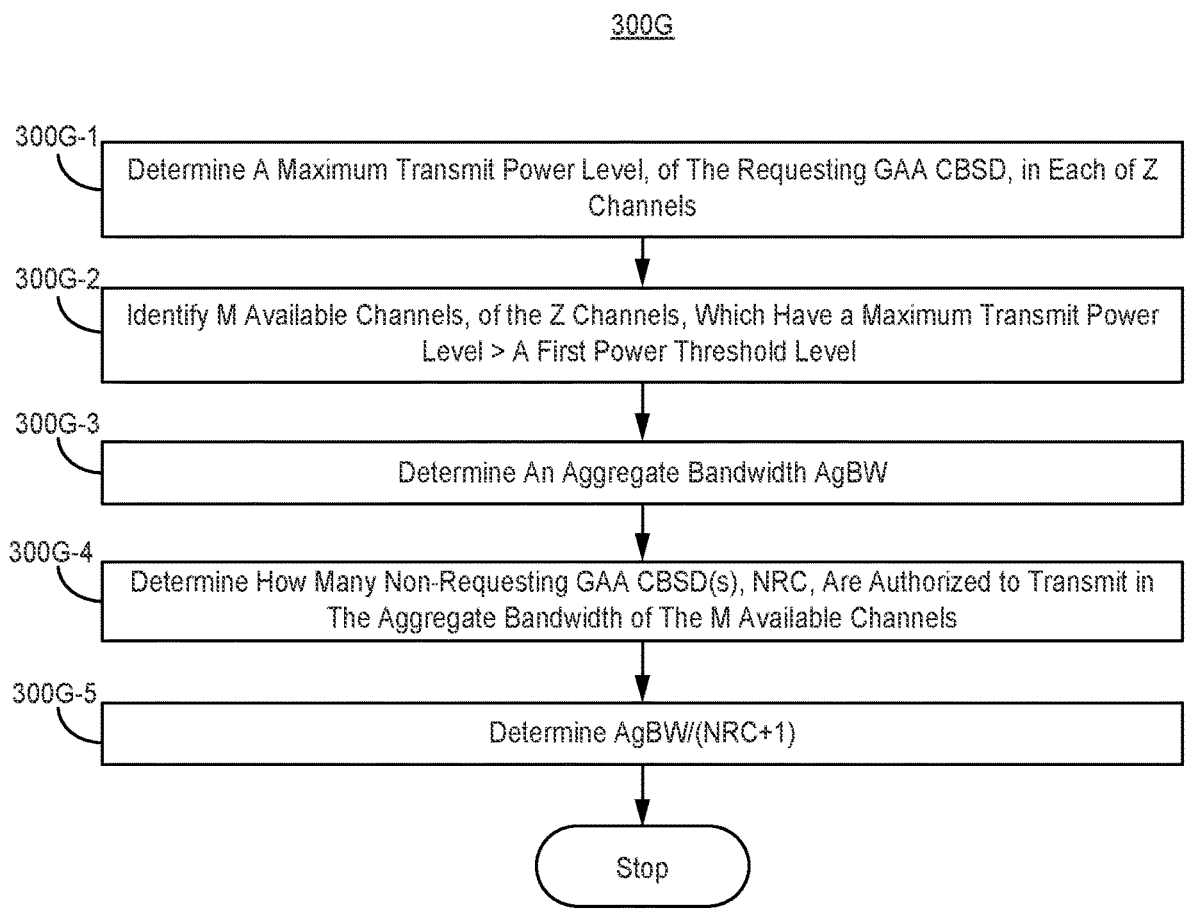
FIG. 3 illustrates a flow diagram of one embodiment of a method for determining a bandwidth quota for a requesting GAA CBSD.

In block 200G, a bandwidth quota for the requesting GAA CBSD is determined. The bandwidth quota means a pro-rata share of an aggregate bandwidth, wherein the aggregate bandwidth equals a bandwidth per channel multiplied by M, wherein M is a number of channels, of the Z channels, which have a maximum transmit power level greater than a first power threshold level, and wherein the Z channels are channels in which the requesting GAA CBSD is not prohibited from transmitting. FIG. 3 illustrates a flow diagram of one embodiment of a method 300G for determining a bandwidth quota for the requesting GAA CBSD, i.e., block 200G.

In block 300G-1, a maximum transmit power level, of the requesting GAA CBSD, in each of Z channels is determined. Z Channels mean channels in which the requesting GAA CBSD is not prohibited from transmitting by law, regulation, and/or standard (e.g., at least one of: in (a) an exclusion zone in which the GAA CBSD is geographically located, (b) PAL protection area(s) (PPA(s)) in which the GAA CBSD is geographically located, and/or (c) being used prior to a next to be executed CPAS by an incumbent user in a DPA comprising at least one protection point whose neighborhood encompasses the requesting GAA CBSD). Optionally, the maximum transmit power level may be determined using a first modified version of IAP when at least one protection point is geographically located within the neighborhood around the requesting GAA CBSD. In the first modified version of IAP, a maximum transmit power level is determined for PAL and GAA CBSD(s) that are geographically located within a first neighborhood centered around a protection point representing an incumbent user that is in a second neighborhood centered around the requesting GAA CBSD. The first and the second neighborhoods may or may not have different dimensions. If there is no protection point geographically located within the second neighborhood, then the first modified IAP will not be performed and the maximum transmit power level of the requesting GAA CBSD would be determined to be the maximum transmit power level requested, in the grant request, by the requesting GAA CBSD.

In block 300G-2, identify M available channels, of the Z channels, which have a maximum transmit power level greater than a first power threshold level. Optionally, the first power threshold level is a value that is three decibels less than the maximum transmit power level requested in the grant request received from the requesting GAA CBSD. M available channels may also be referred to herein as M first available channels, M channels, or M first channels. In block 300G-3, an aggregate bandwidth, AgBW, of the M available channels is determined. The aggregate bandwidth equals a bandwidth per channel*M. The bandwidth per channel is equal for the Z channels in the shared spectrum. Optionally, the bandwidth per channel is 10 MHz.

In block 300G-4, a number, of non-requesting GAA CBSD(s), NRC, that are authorized to transmit in the aggregate bandwidth of the M available channels, is determined. The non-requesting GAA CBSD(s) are authorized to transmit in channel(s) which are orthogonal to the channel requested, in the grant request, by the requesting GAA CBSD. In block 300G-5, AgBW/(NRC+1) (which is the bandwidth quota) is determined.

Returning to FIG. 2, in block 200H whether the total bandwidth (total BW) assigned to the requesting GAA CBSD is greater than the bandwidth quota is determined. The total bandwidth assigned to the requesting GAA CBSD is a sum of (a) a bandwidth of each channel in which the requesting GAA CBSD is presently authorized to transmit, and (b) a bandwidth of a channel identified in the grant request received in block 200A.

Figure 4:
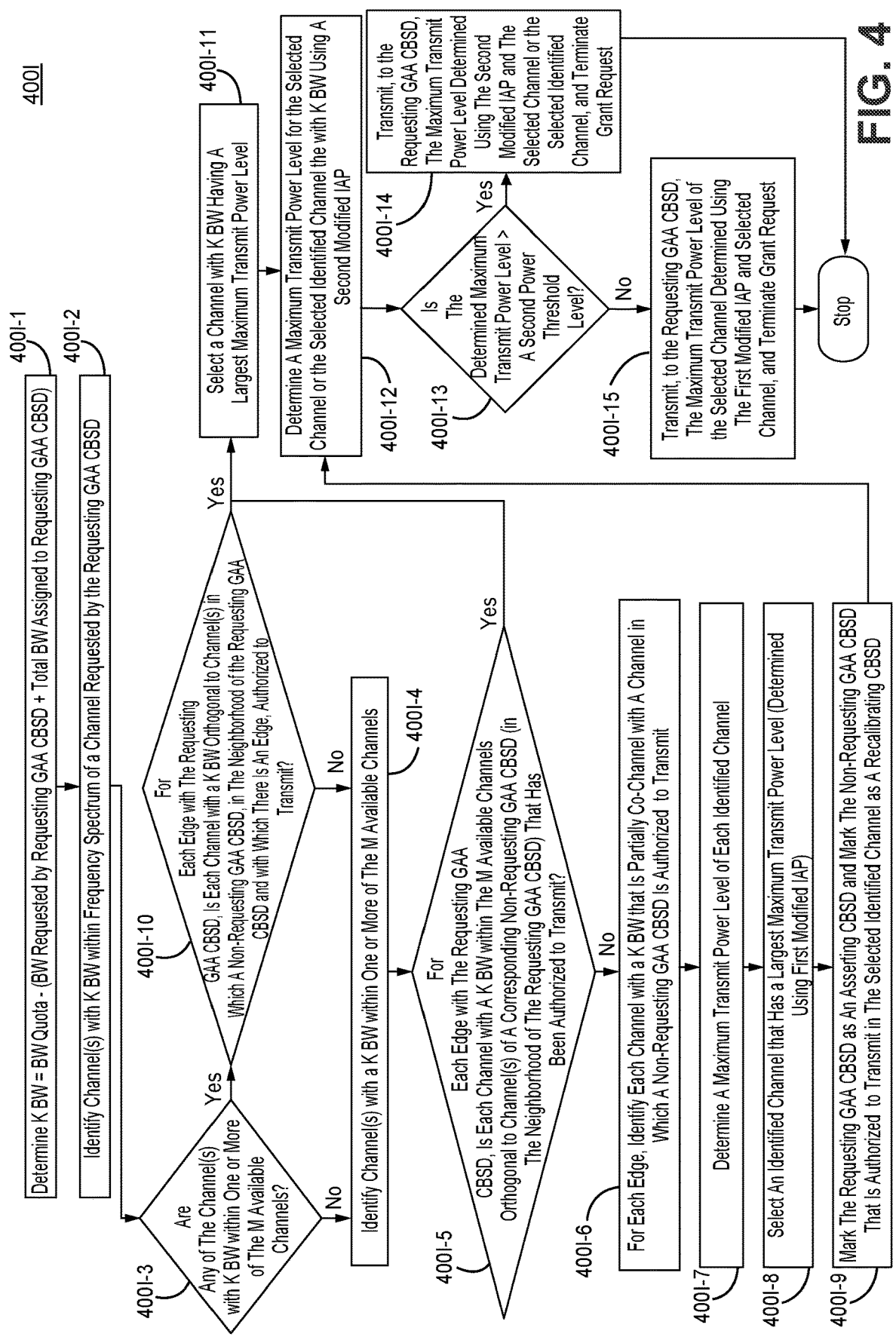
FIG. 4 illustrates a flow diagram of one embodiment of a method for determining a channel orthogonal, or non-orthogonal if no orthogonal channels exist, to channels in which non-requesting GAA CBSD(s), geographically located in a neighborhood centered around the requesting GAA CBSD, are presently authorized to transmit.

If the total bandwidth assigned to the requesting GAA CBSD is not greater than the bandwidth quota, then in block 200I, determine a channel orthogonal, or non-orthogonal if no orthogonal channels exist, to channels in which non-requesting GAA CBSD(s), geographically located in a neighborhood centered around the requesting GAA CBSD, are presently authorized to transmit; further, transmit the determined channel and/or the determined maximum transmit power level to the requesting GAA CBSD. Thus, the maximum transmit power level is determined for the channel requested in the grant request by the requesting GAA CBSD or another channel available for use by the requesting GAA CBSD. FIG. 4 illustrates a flow diagram of one embodiment of a method 400I for determining a channel orthogonal, or non-orthogonal if no orthogonal channels exist, to channels in which non-requesting GAA CBSD(s), geographically located in a neighborhood centered around the requesting GAA CBSD, are presently authorized to transmit, i.e., block 200I.

In block 400I-1, a K bandwidth (K BW) is determined.

K BW=BW Quota−(BW Requested by Requesting GAA CBSD+Total BW Assigned to Requesting GAA CBSD), where K is an integer multiple of the bandwidth of each of the Z channels, BW Quota is the determined bandwidth quota, BW Requested by Requesting GAA CBSD means a sum of bandwidth of each channel requested by the requesting GAA CBSD in the received grant request, and Total BW Assigned to Requesting GAA CBSD means a sum of bandwidth of each channel for which the requesting GAA CBSD is presently authorized. In block 400I-2, at least one channel with K bandwidth within a frequency spectrum of a channel requested by the requesting GAA CBSD is identified.

In block 400I-3, whether at least one of the at least one channel with K bandwidth is within one of the M available channels is determined. If at least one channel with K bandwidth is within one or more of the M available channels, then proceed to block 400I-10.

If none of the channels with K bandwidth is within one or more of the M available channels, then proceed to block 400I-4. In block 400I-4, at least one channel with K bandwidth is within one or more of the M available channels is identified. In block 400I-5, for each edge between the requesting GAA CBSD and the set of non-requesting GAA CBSDs in the neighborhood centered around the requesting GAA CBSD, whether each channel with a K bandwidth is within one or more of the M available channels is orthogonal to the channel(s) of the set of non-requesting GAA CBSD(s) (in the neighborhood centered around the requesting GAA CBSD) that has been authorized to transmit is determined. If any channel with a K bandwidth is within one or more of the M available channels is orthogonal to the channels of the non-requesting GAA CBSDs (in the neighborhood centered around the requesting GAA CBSD) that has been authorized to transmit, then proceed to block 400I-11. If each channel with a K bandwidth is within one or more of the M available channels is not orthogonal to the channels of the non-requesting GAA CBSDs (in the neighborhood centered around the requesting GAA CBSD) that has been authorized to transmit, then proceed to block 400I-6.

In block 400I-6, for each edge between a requesting GAA CBSD and a non-requesting GAA CBSD (in a neighborhood centered around the requesting GAA CBSD), each channel, with a K bandwidth that is partially co-channel with a channel in which a non-requesting GAA CBSD is authorized to transmit, is identified. Partially co-channel means that at least two channels share a portion of the same frequency spectrum.

In block 400I-7, a maximum transmit power level for each identified channel is determined. The maximum transmit power level of each identified channel is a minimum value of a set of maximum transmit power levels comprising a maximum transmit power level of each Z channel; the maximum transmit power level of each Z channel was determined in block 300G-1. In block 400I-8, an identified channel that has a largest maximum transmit power is determined. In block 400I-9, the requesting GAA CBSD is marked (or otherwise identified) as an asserting CBSD and the non-requesting GAA CBSD that is authorized to transmit in the selected identified channel is marked (or otherwise identified) as a recalibrating CBSD. Such markings (or other identifications) are removed or cleared at the next to be executed CPAS. After block 400I-9, proceed to block 400I-12. A recalibrating CBSD means a requesting GAA CBSD that has an edge with a former requesting GAA CBSD geographically located in the neighborhood of the requesting CBSD and where the former requesting GAA CBSD received authorization to transmit in a channel (a) in the shared spectrum at a time between the prior executed CPAS and the next to be executed CPAS and (a) which overlaps a channel in which the requesting GAA CBSD is authorized to transmit prior to the requesting GAA CBSD transmitting its grant request. The former requesting GAA CBSD referred to in the definition of the recalibrating CBSD may also be referred to herein as the asserting CBSD.

In block 400I-10, for each edge between the requesting GAA CBSD and a non-requesting GAA CBSD geographically located within a neighborhood centered around the GAA CBSD, whether any channel with a K bandwidth is orthogonal to channel(s) in which the set of non-requesting GAA CBSD(s), in the neighborhood centered around the requesting GAA CBSD and with which there is an edge, are authorized to transmit is determined. If any such channel is present, then proceed to block 400I-11. If no channel present, then proceed to block 400I-4.

In block 400I-11, a channel with a K bandwidth having a largest maximum transmit power level is selected. The maximum transmit power level of each channel with K bandwidth is a minimum value of a set of maximum transmit power levels comprising a maximum transmit power level of each Z channel within the channel with K bandwidth; the maximum transmit power level of each Z channel was determined in block 300G-1. After block 400I-11, proceed to block 400I-12.

In block 400I-12, using a second modified IAP, a maximum transmit power level for the selected identified channel with K bandwidth (selected in block 400I-8) or the selected channel with K bandwidth (selected in block 400I-11). The second modified IAP is performed by determining, using IAP, a maximum transmit power level of each GAA CBSD of a set of GAA CBSD(s) (consisting of GAA CBSD(s) each of which have been provided an authorization to transmit in shared spectrum after the last executed CPAS) so that an aggregate interference from each GAA CBSD of the set at each protection point (wherein each protection point represents an incumbent user or geographic region) geographically located in a neighborhood centered around the requesting GAA CBSD is equal to or less than the daytime margin. A daytime margin (or head room margin) is a pre-IAP margin, e.g., specified by WInnForum Test and Certification for Citizens Broadband Radio Service (CBRS); Conformance and Performance Test Technical Specification; SAS as Unit Under Test (UUT), Document WINNF-TS-0061, version V1.5.1, dated Oct. 7, 2019 (hereinafter "WINNF-TS-0061") which is herein incorporated by reference hereto in its entirety. The daytime margin, e.g., $HM_p$, at a protection point means a margin created due to a reduction (pre-IAP head room, $Mg_p$), e.g., 1 dB, of an protection point interference threshold, $Q_p$, at a protection point, and as is further described in WINNF-TS-061. If more than one SAS controls CBSDs geographically located within a neighborhood centered around the protection point, then a daytime margin allocated to each such SAS is the daytime margin divided by the number of such SASs.

In block 400I-13, whether the determined maximum transmit power level for the selected identified channel with K bandwidth (selected in block 400I-8) or the selected channel (selected in block 400I-11) with a K bandwidth is greater than a second power threshold level is determined. Optionally, the second power threshold level is a value that is three decibels less than the maximum transmit power level requested in the grant request received from the requesting GAA CBSD. The first and second power threshold levels may be equal or different. If the determined maximum transmit power level for the selected identified channel with K bandwidth or the selected channel with a K bandwidth is greater than a second power threshold level, then in block 400I-14 the maximum transmit power level determined using the second modified IAP and the selected channel or the selected identified channel corresponding to the maximum transmit power level are transmitted to the requesting GAA CBSD, and the grant request is terminated, e.g., through a heart beat response message. Optionally, the heart beat response message is a message sent to the CBSD from the SAS in response to another message, e.g., periodically, sent from the CBSD to the SAS. If the determined maximum transmit power level for the selected identified channel with K bandwidth or the selected channel with a K bandwidth is not greater than a second power threshold level, then in block 400I-15 the maximum transmit power level, of the selected channel, determined using the first modified IAP and the selected channel are transmitted to the requesting GAA CBSD, and the grant request is terminated, e.g., through a heart beat response message. Optionally, such transmission may be through a heartbeat message which is sent, e.g., periodically, from the SAS to the requesting GAA CBSD.

Returning to FIG. 2, if the total bandwidth assigned to the requesting GAA CBSD is greater than the bandwidth quota, then in block 200J whether the requesting GAA CBSD is a recalibrating CBSD (e.g., is marked a recalibrating CBSD) since the last execution of CPAS is determined. If the requesting GAA CBSD is not a recalibrating CBSD (e.g., is not marked as a recalibrating CBSD) since the last execution of CPAS, then in block 200K if no free frequency spectrum is available, then diminish bandwidth allocated to the requesting GAA CBSD to equal the bandwidth quota, or if free frequency spectrum is available, then, determine and transmit, to the requesting GAA CBSD, (a) a channel with which there is no edge with a non-requesting GAA CBSD and which is in free frequency spectrum and/or (b) a maximum transmit power level in the determined channel for the requesting GAA CBSD. Free frequency spectrum means frequency spectrum which is orthogonal to frequency spectrum of any incumbent user(s), incumbent region(s), and any non-requesting GAA CBSD(s) which are geographically located in a neighborhood centered around the requesting GAA CBSD. In block 200K, if one or more channels which are in the free frequency spectrum, then one of those channels is identified for use by and sent to the requesting GAA CBSD.

Figure 5:
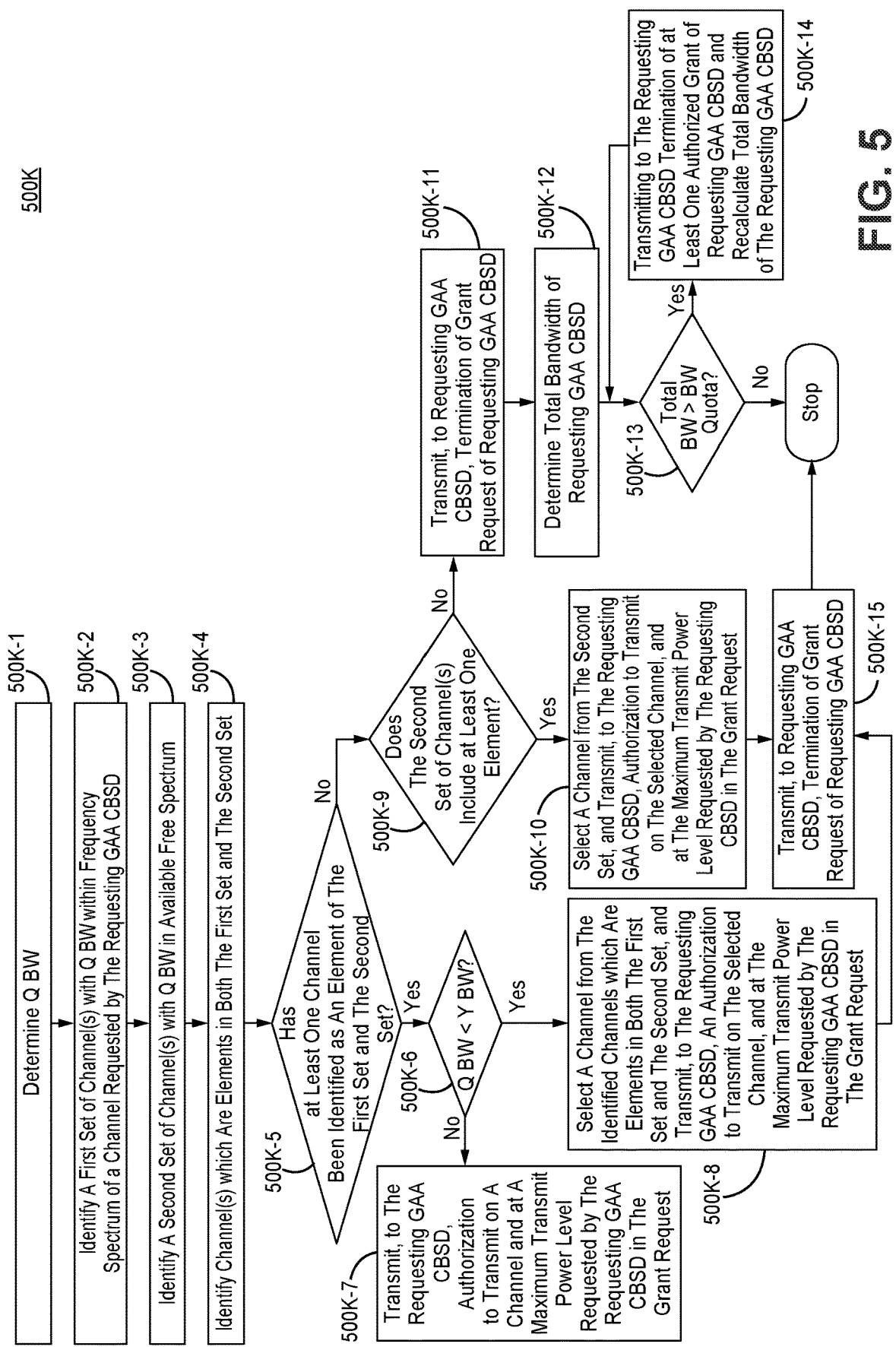
FIG. 5 illustrates a flow diagram of one embodiment of a method for diminishing bandwidth allocated to the requesting GAA CBSD and/or determining a maximum transmit power level for the requesting GAA CBSD.

FIG. 5 illustrates a flow diagram of one embodiment of a method 500K for diminishing bandwidth allocated to the requesting GAA CBSD and/or determining a channel and/or a maximum transmit power level for the requesting GAA CBSD, i.e., block 200K. In block 500K-1, Q bandwidth (Q BW) is determined. The Q bandwidth is a minimum of a bandwidth threshold and a Y bandwidth. Y bandwidth is a bandwidth of the at least one channel requested in the grant request by the requesting GAA CBSD.

In block 500K-2, a first set of at least one channel with Q bandwidth within the at least one channel requested in such grant request from the requesting GAA CBSD are identified. In block 500K-3, a second set of at least one channel with Q bandwidth in the free frequency spectrum is identified. In block 500K-4, any channel(s) which are an element in both the first set of at least one channel and the second set of at least one channel are identified.

In block 500K-5, whether at least one channel has been identified as an element of the first set of at least one channel and the second set of at least one channel is determined. If at least one channel has been identified as an element of the first set of at least one channel and the second set of at least one channel, then proceed to block 500K-6. If at least one channel has not been identified as an element of the first set of at least one channel and the second set of at least one channel, then proceed to block 500K-9

In block 500K-6, whether Q bandwidth is less than Y bandwidth is determined. If Q bandwidth is not less than Y bandwidth, then in block 500K-7 authorization to transmit on a channel and at a maximum transmit power level (requested in a grant request by the requesting GAA CBSD) is transmitted to the requesting GAA CBSD. Optionally, such transmission is in an authorization, e.g., through a heart beat response message, e.g., sent by the SAS to the requesting GAA CBSD. If Q bandwidth is less than Y bandwidth, then in block 500K-8 a channel (from the identified channels which are elements in both the first set of at least one element and the second set of at least one element) is selected, e.g., randomly or by algorithm (e.g., from lowest to highest center frequency or vice versa); authorization to transmit on the selected channel, and at the maximum transmit power level requested (in the grant request) by the requesting GAA CBSD, is transmitted to the requesting GAA CBSD. Optionally, such transmission is in a heart beat response message described elsewhere herein.

After each of blocks 500K-8 and 500K-10 proceed to block 500K-15. In block 500K-15, a termination of the grant request of the requesting GAA CBSD is transmitted to the requesting GAA CBSD, e.g., using a heart beat response message.

In block 500K-9, whether the second set of at least one channel includes at least one element is determined. If the second set includes at least one element, then in block 500K-10 select, e.g., randomly or with an algorithm (e.g., from lowest to highest center frequency or vice versa), a channel from the second set; authorization to transmit on the selected channel, and at the maximum transmit power level requested by the requesting GAA CBSD (in a grant request by the requesting GAA CBSD), is transmitted to the requesting GAA CBSD. Optionally, such transmission is in a heart beat response message described elsewhere herein.

If the second set does not includes at least one element, then in block 500K-11 a termination of the grant request of the requesting GAA CBSD is transmitted to the requesting GAA CBSD, e.g., using a heart beat response message. In block 500K-12, a total bandwidth of the requesting GAA CBSD is determined. In block 500K-13, whether the total bandwidth is greater than the bandwidth quota is determined. If it is determined that the total bandwidth is greater than the bandwidth quota, then in block 500K-14 transmitting to the requesting GAA CBSD termination of at least one authorized grant of the requesting GAA CBSD (e.g., where the terminated authorized grant is selected randomly or by algorithm (e.g., from lowest to highest center frequency or vice versa)), and the total bandwidth of the requesting GAA CBSD is redetermined. The redetermined total bandwidth is calculated excluding the terminated at least one authorized grant of the requesting GAA CBSD. After performing block 500K-14, return to block 500K-13.

Returning to FIG. 2, if the requesting GAA CBSD is a recalibrating CBSD (e.g., is marked as a recalibrating CBSD) since the last execution of CPAS, then in block 200L (i) (a) determining a channel, orthogonal or non-orthogonal if no orthogonal channels exist to channels in which each non-requesting GAA CBSD are presently authorized to transmit, and then diminishing bandwidth in the shared spectrum in which the requesting GAA CBSD is presently authorized to transmit to equal the bandwidth quota, and/or (b) determining a maximum transmit power level for the determined channel, and (ii) transmit the determined channel and/or the determined maximum transmit power level to the requesting GAA CBSD. Optionally, such transmission is in a heart beat response message described elsewhere herein. Diminishing bandwidth as mentioned herein ensures that the bandwidth allocated to a requesting GAA CBSD is no greater than the determined bandwidth quota. Block 200L diminishes the bandwidth as described above, and determines a channel that is not co-channel with the asserting GAA CBSD.

Figure 6:
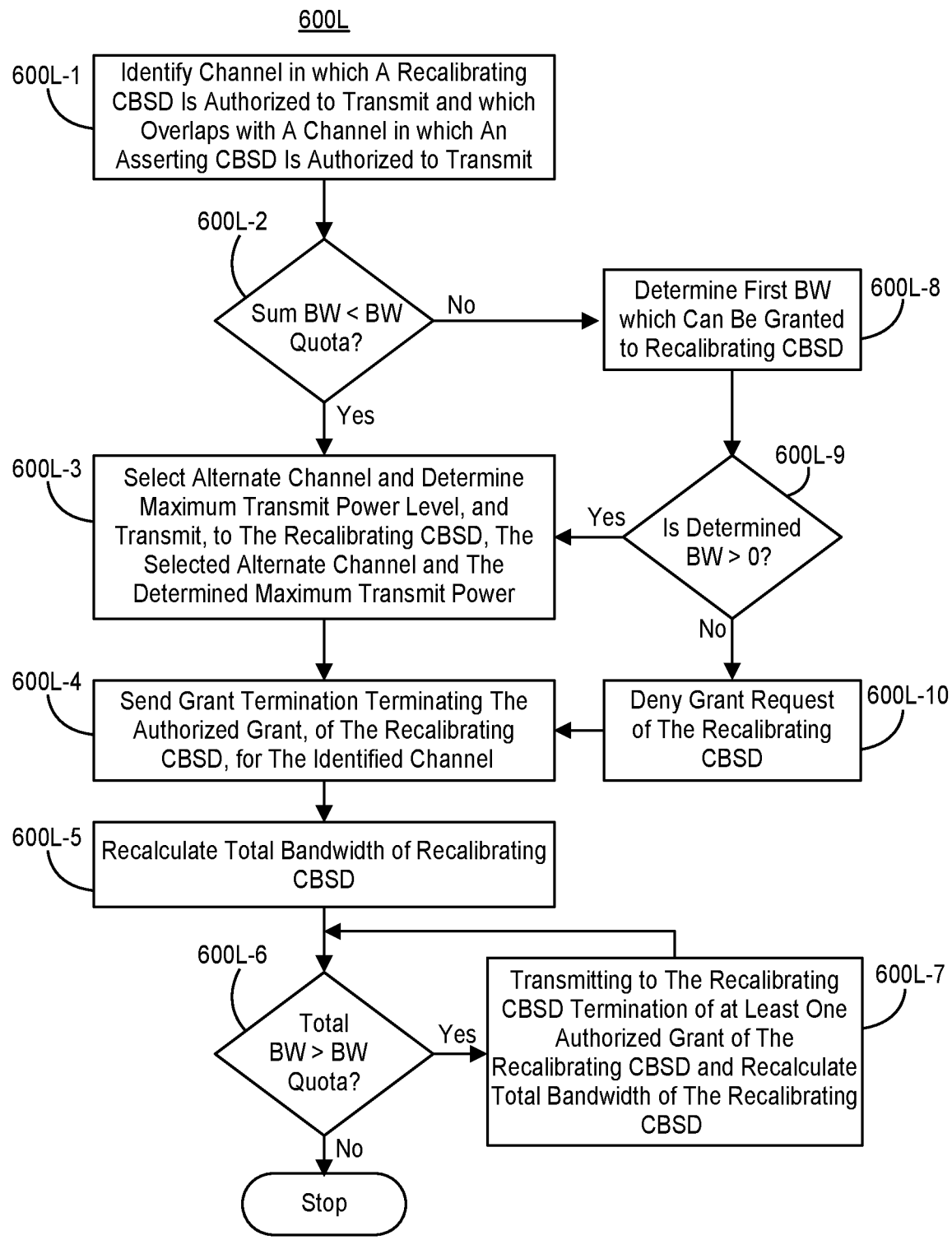
FIG. 6 illustrates a flow diagram of one embodiment of a method for diminishing bandwidth allocated to the requesting GAA CBSD and/or determining a maximum transmit power level for the requesting GAA CBSD.

FIG. 6 illustrates a flow diagram of one embodiment of a method 600L for diminishing bandwidth allocated to the requesting GAA CBSD and/or determining a maximum transmit power level for the requesting GAA CBSD, i.e., block 200L. In block 600L-1, a channel in which the recalibrating CBSD is authorized to transmit and which overlaps the same or another channel in which an asserting CBSD is authorized to transmit is identified. Overlap means that at least two channels share common frequency spectrum.

In block 600L-2, whether a sum bandwidth (sum BW) is less than the bandwidth quota is determined.

Sum BW=Total BW−Asserted BW+Requested BW.
where the total bandwidth for a recalibrating CBSD has the same meaning as the definition of total bandwidth specified above; the requesting GAA CBSD has been marked a recalibrating CBSD, the asserted bandwidth (asserted BW) means a bandwidth of frequency spectrum overlapping the channel of an asserting CBSD and a channel of the recalibrating CBSD; interference from the asserting CBSD to the requesting CBSD in the overlapping spectrum gave rise to the requesting CBSD to issue a grant request prior to the next to be executed CPAS, requested bandwidth (requested BW) means bandwidth requested by the requesting CBSD in its grant request, i.e., as a result of interference from the asserting CBSD.

If the sum bandwidth is not less than the bandwidth quota, then proceed to block 600L-8. If the sum bandwidth is less than the bandwidth quota, then proceed to block 600L-3.

In block 600L-8, a first bandwidth (first BW) which can be granted to the recalibrating CBSD is determined.

First BW=BW Quota−(Total BW−Asserted BW)

After block 600L-8, then in block 600L-9, whether the determined first bandwidth is greater than zero is determined. If the first bandwidth is greater than zero, then proceed to block 600L-3. If the first bandwidth is not greater than zero, then in block 600L-10, transmit a grant request denial to the recalibrating CBSD, e.g., using a heart beat response message or a grant request response. After, block 600L-10, proceed to block 600L-4.

In block 600L-3, an alternate channel is selected and a maximum transmit power level is determined; the selected alternate channel and the determined maximum transmit power are transmitted to the recalibrating CBSD. Optionally, such transmission may be through a heartbeat message which is sent, e.g., periodically, from the SAS to the requesting GAA CBSD which in this case is the recalibrating CBSD.

Figure 7:
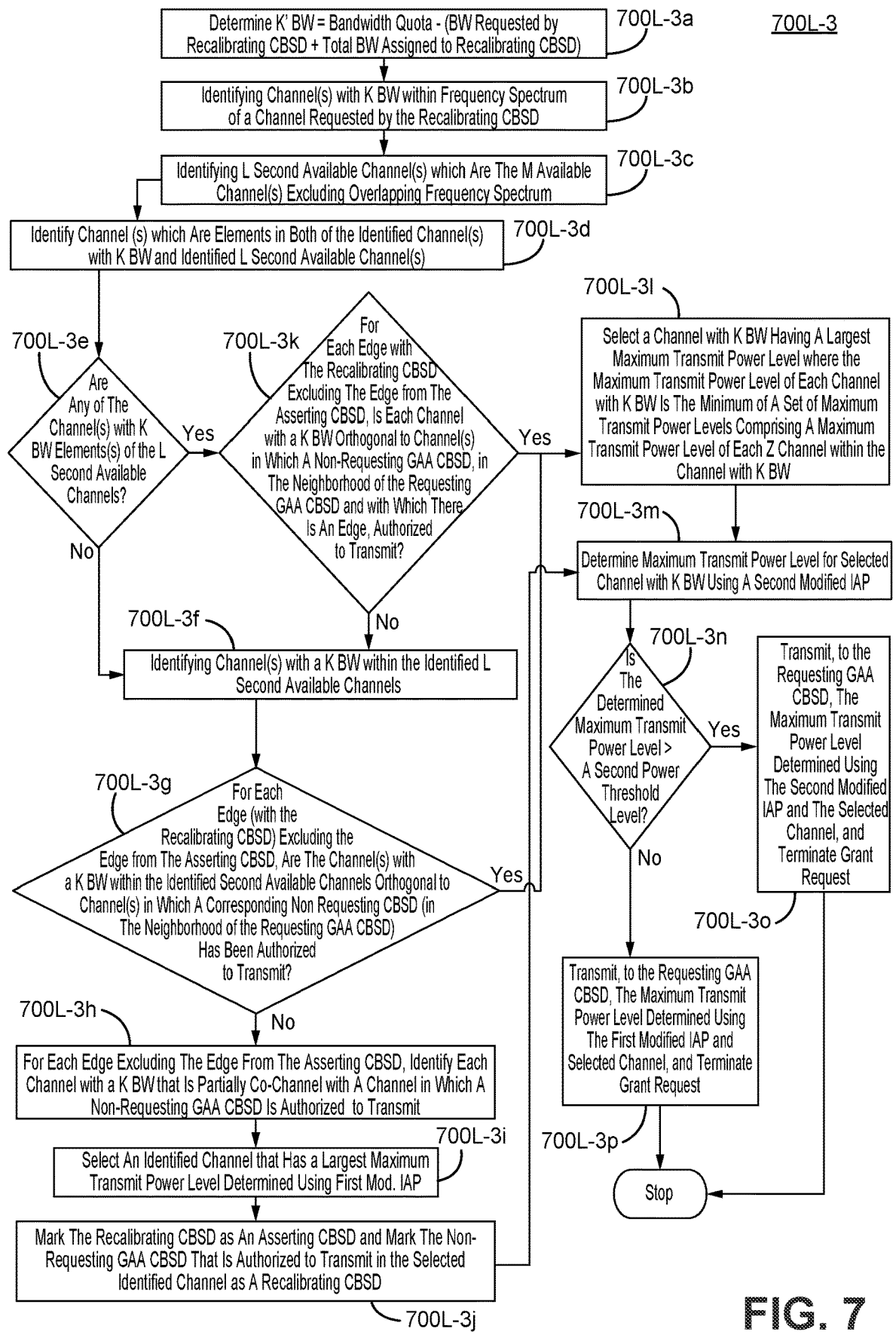
FIG. 7 illustrates a flow diagram of one embodiment of a method for selecting an alternate channel.

FIG. 7 illustrates a flow diagram of one embodiment of a method 700L-3 for selecting an alternate channel, i.e., for block 600L-3. In block 700L-3a, a K' bandwidth (K' BW) is determined.

K' BW=BW Quota−(BW Requested by the Recalibrating CBSD+Total BW Assigned to the Recalibrating CBSD), where K bandwidth and K' bandwidth differ only in that for K' bandwidth the requesting GAA CBSD is the recalibrating CBSD.

In block 700L-3b, at least one channel with K bandwidth within frequency spectrum of a channel requested by the recalibrating CBSD (in the grant request of the recalibrating CBSD) is identified. In block 700L-3c, at least one L second available channel (which are the at least one M available channel excluding overlapping frequency spectrum) is identified; an overlapping channel means frequency spectrum overlapping the channel of an asserting CBSD and the channel of the requesting CBSD. L second available channels may also be referred to herein as L available channels, L channels, or L second channels.

In block 700L-3d, any channel(s) which are an element in both the identified at least one channel with K bandwidth, identified in block 700L-3b, and the L second set of at least one channel, identified in block 700L-3c, are identified. In block 700l-3e, whether at least one channel has been identified as an element of the identified at least one channel with K bandwidth and the L second set of at least one channel is determined. If at least one channel has been identified as an element of the identified at least one channel with K bandwidth and the L second set of at least one channel, then proceed to block 700L-3k. If at least one channel has not been identified as an element of the identified at least one channel with K bandwidth and the L second set of at least one channel, then proceed to block 700L-3f.

In block 700L-3f, at least one channel with a K bandwidth within the identified L second available channels is identified. In block 700L-3g, for each edge between the recalibrating CBSD and a non-requesting GAA CBSD (excluding the asserting CBSD) in a neighborhood centered around the recalibrating CBSD, whether there is at least one channel with K bandwidth within the identified L second available channels that is orthogonal to the channels in which a non-requesting CBSDs (which is within a neighborhood centered around the non-recalibrating CBSD, forms an edge with the recalibrating CBSD, and is not the asserting CBSD)

has been authorized to transmit is determined. If there is at least one channel with K bandwidth within the identified L second available channels that is orthogonal to the channels in which non-requesting CBSDs has been authorized to transmit, then proceed to block 700L-31. If there is not at least one channel with K bandwidth within the identified L second available channels that is orthogonal to the channels in which such non-requesting CBSDs has been authorized to transmit, then proceed to block 700L-3h.

In block 700L-3h, for each edge between the recalibrating CBSD and a non-requesting GAA CBSD (excluding the asserting CBSD) in a neighborhood centered around the recalibrating CBSD, each channel, with K bandwidth that is partially co-channel with a channel in which a non-requesting GAA is authorized to transmit, is identified. In block 700L-3i, an identified channel that has a largest maximum transmit power level is determined using the first modified IAP. In block 700L-3j, the recalibrating CBSD is marked as an asserting CBSD and the non-requesting GAA CBSD that is transmitting in the selected identified channel is marked as a recalibrating CBSD. Such markings (or other identifications) are removed or cleared at the next to be executed CPAS. After block, 700L-3h, proceed to block 700L-31.

In block 700L-3k, for each edge between the recalibrating CBSD and a non-requesting GAA CBSD (excluding the asserting CBSD) in a neighborhood centered around the recalibrating CBSD, whether each channel with a K bandwidth orthogonal to the channels in which the non-requesting GAA CBSDs (in a neighborhood centered around the recalibrating CBSD and with which there is an edge with the recalibrating CBSD) is authorized to transmit is determined. For each edge between the recalibrating CBSD and a non-requesting GAA CBSD (excluding the asserting CBSD) in a neighborhood centered around the recalibrating CBSD, if at least one channel with a K bandwidth orthogonal to the channels in which the non-requesting GAA CBSDs (in a neighborhood centered around the recalibrating CBSD and with which there is an edge with the recalibrating CBSD) are authorized to transmit, then proceed to block 700L-31. For each edge between the recalibrating CBSD and a non-requesting GAA CBSD (excluding the asserting CBSD) in a neighborhood centered around the recalibrating CBSD, if each channel with a K bandwidth is not orthogonal to the channels in which the non-requesting GAA CBSDs (in a neighborhood centered around the recalibrating CBSD and with which there is an edge with the recalibrating CBSD) are authorized to transmit, then proceed to block 700L-3f.

In block 700L-3l, a channel with K bandwidth having a largest maximum transmit power level is selected, where the maximum transmit power level of each channel with K bandwidth is a minimum of a set of maximum transmit power levels comprising a maximum transmit power level of each Z channel within the channel with K bandwidth. In block 700L-3m, a maximum transmit power level for the selected channel with K bandwidth is determined using the second modified IAP.

In block 700L-3n, whether the determined maximum transmit power level for the selected channel with K bandwidth is greater than a second power threshold level is determined. If the determined maximum transmit power level for the selected channel with K bandwidth is greater than the second power threshold level, then in block 700L-3o the maximum transmit power level determined using the second modified IAP and the selected channel corresponding to the maximum transmit power level are transmitted to the requesting GAA CBSD, and the grant request is terminated, e.g., using a heart beat response message. Optionally, such transmission may be through a heartbeat message which is sent, e.g., periodically, from the SAS to the requesting GAA CBSD. If the determined maximum transmit power level for the selected channel with K bandwidth is not greater than the second power threshold level, then in block 700L-3p the maximum transmit power level determined using the first modified IAP and the selected channel are transmitted to the requesting GAA CBSD, and the grant request is terminated, e.g., using a heart beat response message. Optionally, such transmission may be through a heartbeat message which is sent, e.g., periodically, from the SAS to the requesting GAA CBSD.

Returning to FIG. 6, in block 600L-4, a grant termination terminating an authorized grant, of the recalibrating CBSD, for identified channel (identified in block 600L-1) is transmitted to the recalibrating CBSD. In block 600L-5, a total bandwidth of the recalibrating CBSD is recalculated; the recalculated total bandwidth accounts for the diminished bandwidth utilized by the recalibrating CBSD due to the grant termination with respect to block 600L-4.

In block 600L-6, whether the total bandwidth is greater than the bandwidth quota is determined. If it is determined that the total bandwidth is greater than the bandwidth quota, then in block 600L-7 transmitting (to the recalibrating CBSD) a termination of at least one authorized grant of the recalibrating CBSD is terminated (e.g., randomly or by algorithm (e.g., from lowest to highest center frequency or vice versa)), and the total bandwidth of the recalibrating CBSD is redetermined. The redetermined total bandwidth is calculated excluding the terminated at least one authorized grant of the recalibrating CBSD. After performing block 600L-7, return to block 600L-6.

The processor circuitry described herein may include one or more microprocessors, microcontrollers, digital signal processing (DSP) elements, application-specific integrated circuits (ASICs), and/or field programmable gate arrays (FPGAs). In this exemplary embodiment, processor circuitry includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuitry described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods of the invention can be implemented in computer readable instructions, such as program modules or applications, which may be stored in the computer readable medium that is part of (optionally the memory circuitry) or communicatively coupled to the processing circuitry, and executed by the processing circuitry, optionally the processor circuitry. Generally, program modules or applications include routines, programs, objects, data components, data structures, algorithms, and the like, which perform particular tasks or implement particular abstract data types.

Databases as used herein may be either conventional databases or data storage formats of any type, e.g., data files. Although separate databases are recited herein, one or more of such databases may be combined.

Exemplary Embodiments

Example 1 includes a method, comprising: receiving a grant request (a) specifying a channel in shared frequency spectrum and (b) a maximum transmit power level at which a requesting general authorized access (GAA) citizens broadband radio service device (CBSD) desires to transmit in the specified channel, and transmitted by the requesting GAA CBSD; identifying each edge between a non-requesting GAA CBSD and the requesting GAA CBSD, wherein each non-requesting GAA CBSD is geographically located in a neighborhood centered around the requesting GAA CBSD; determining whether there is at least one edge between the requesting GAA CBSD and at least one non-requesting GAA CBSD; determining that there is the at least one edge between the requesting GAA CBSD and the at least one non-requesting GAA CBSD, then determining, for the requesting GAA CBSD, a bandwidth quota; determining whether a total bandwidth (Total BW) assigned to the requesting GAA CBSD is greater than the bandwidth quota, wherein the total bandwidth assigned to the requesting GAA CBSD is a sum of (a) a bandwidth of each channel in which the requesting GAA CBSD is presently authorized to transmit, and (b) a bandwidth of a channel identified in the grant request; determining that the total bandwidth assigned to the requesting GAA CBSD is not greater than the bandwidth quota, then determining (a) a channel, orthogonal or non-orthogonal if no orthogonal channels exist to channels in which each non-requesting GAA CBSD are presently authorized to transmit and/or (b) a maximum transmit power level for a determined channel, and transmitting the determined channel and/or the determined maximum transmit power level to the requesting GAA CBSD; determining whether the requesting GAA CBSD is marked as a recalibrating CBSD, wherein the recalibrating CBSD is a requesting GAA CBSD that has an edge with a former requesting GAA CBSD geographically located in the neighborhood of the requesting GAA CBSD and wherein the former requesting GAA CBSD received authorization to transmit in a channel (a) in the shared frequency spectrum at a time between a prior executed Coordinated Periodic Activities among SASs (CPAS) and a next to be executed CPAS and (a) which overlaps a channel in which the requesting GAA CBSD is authorized to transmit prior to the requesting GAA CBSD transmitting its grant request; determining that the requesting GAA CBSD is not a recalibrating CBSD, then if no free frequency spectrum is available, then diminishing bandwidth allocated to the requesting GAA CBSD to equal the bandwidth quota, or if the free frequency spectrum is available, then, determining and transmitting, to the requesting GAA CBSD, (a) a channel which is in the free frequency spectrum and/or (b) a maximum transmit power level for the determined channel for requested by the requesting GAA CBSD, wherein the free frequency spectrum means frequency spectrum which is orthogonal to frequency spectrum of any incumbent user(s), incumbent region(s), and any non-requesting GAA CBSD(s) which are geographically located in a neighborhood centered around the requesting GAA CBSD; and determining that the requesting GAA CBSD is a recalibrating CBSD, then (i) (a) determining a channel, orthogonal or non-orthogonal if no orthogonal channels exist to channels in which each non-requesting GAA CBSD are presently authorized to transmit, and then diminishing bandwidth in the shared frequency spectrum in which the requesting GAA CBSD is presently authorized to transmit to equal the bandwidth quota, and/or (b) determining a maximum transmit power level for the determined channel, and (ii) transmitting the determined channel and/or the determined maximum transmit power level to the requesting GAA CBSD; wherein the requesting GAA CBSD is configured to transmit using the determined maximum transmit power level and/or the determined channel.

Example 2 includes the method of Example 1, wherein determining, for the requesting GAA CBSD, a bandwidth quota comprises: determining a maximum transmit power level, of the requesting GAA CBSD, in each of Z channels, wherein the Z channels are channels in which the requesting GAA CBSD is not prohibited from transmitting by law, regulation, and/or standard; identifying M available channels, of the Z channels, which have a maximum transmit power level greater than a first power threshold level; determining an aggregate bandwidth (AgBW) of the M available channels, wherein the aggregate bandwidth equals a bandwidth per channel multiplied by M; determining a number, of each non-requesting GAA CBSD (NRC) that are authorized to transmit in the aggregate bandwidth of the M available channels, wherein each NRC is authorized to transmit in at least one channel which is orthogonal to the channel specified, in the grant request, by the requesting GAA CBSD; and determining AgBW/(NRC+1).

Example 3 includes the method of any of Examples 1-2, wherein determining the bandwidth quota comprises determining a maximum transmit power level of requesting GAA CBSD in each of Z channels using a first modified iterative allocation process (IAP); wherein determining (a) the channel, orthogonal or non-orthogonal if no orthogonal channels exist to the at least one channel in which each non-requesting GAA CBSD is presently authorized to transmit and/or (b) the maximum transmit power level for the determined channel, and transmitting the determined channel and/or the determined maximum transmit power level to the requesting GAA CBSD comprises: determining a K bandwidth (K BW), wherein K BW=BW Quota−(BW Requested by Requesting GAA CBSD+Total BW Assigned to Requesting GAA CBSD), wherein K is an integer multiple of the bandwidth of each of the Z channels, the BW Quota is the determined bandwidth quota, the BW Requested by Requesting GAA CBSD is a sum of bandwidth of each channel requested by the requesting GAA CBSD in the received grant request, and Total BW Assigned to Requesting GAA CBSD is a sum of bandwidth of each channel for which the requesting GAA CBSD is presently authorized; identify at least one channel with K bandwidth within a frequency spectrum of a channel requested by the requesting GAA CBSD; determine whether at least one of the at least one channel with K bandwidth is within one of M available channels, wherein M available channels, of the Z channels, have a maximum transmit power level greater than a first power threshold level; determining that none of the channels with K bandwidth is within one or more of the M available channels, then identify at least one channel with K bandwidth that is within one or more of the M available channels; for each edge between the requesting GAA CBSD and a set of at least one non-requesting GAA CBSD in the neighborhood centered around the requesting GAA CBSD, determining whether each channel with a K bandwidth is within one or more of the M available channels is orthogonal to at least one channel of the set of at least one non-requesting GAA CBSD, in the neighborhood centered around the requesting GAA CBSD, that has been authorized to transmit; determining that each channel with a K bandwidth is within one or more of the M available channels is not orthogonal to the channels of the non-requesting GAA CBSDs, in the neighborhood centered around the requesting GAA CBSD, that has been authorized to transmit, then, for each edge between the requesting GAA CBSD and a non-requesting GAA CBSD in a neighborhood centered around the requesting GAA CBSD, identifying each channel, with a K bandwidth that is partially co-channel with a channel in which a non-requesting GAA CBSD is authorized to transmit, wherein partially co-channel means that at least two channels share a portion of a same frequency spectrum; determining a maximum transmit power level for each identified channel, wherein the maximum transmit power level of each identified channel is a minimum value of a set of maximum transmit power levels comprising a maximum transmit power level of each Z channel; selecting an identified channel that has a largest maximum transmit power; classifying the requesting GAA CBSD as an asserting CBSD and classifying the non-requesting GAA CBSD that is authorized to transmit in the selected identified channel as a recalibrating CBSD, wherein such classifications are cleared at the next to be executed CPAS; determining that at least one channel with K bandwidth is within one or more of the M available channels, then, for each edge between the requesting GAA CBSD and a non-requesting GAA CBSD geographically located within a neighborhood centered around the GAA CBSD, determining whether any channel with a K bandwidth is orthogonal to channel(s) in which the set of at least one non-requesting GAA CBSD, in the neighborhood centered around the requesting GAA CBSD and with which there is an edge, are authorized to transmit; determining that at least one channel with a K bandwidth is within one or more of the M available channels is orthogonal to the channels of the non-requesting GAA CBSDs, in the neighborhood centered around the requesting GAA CBSD, that has been authorized to transmit, then selecting a channel with a K bandwidth having a largest maximum transmit power level; using a second modified IAP, determining a maximum transmit power level for the selected identified channel with K bandwidth or the selected channel with K bandwidth; determining whether the determined maximum transmit power level for the selected identified channel with K bandwidth or the selected channel with a K bandwidth is greater than a second power threshold level; determining that the determined maximum transmit power level for the selected identified channel with K bandwidth or the selected channel with a K bandwidth is greater than the second power threshold level, then transmitting, to the requesting GAA CBSD, the maximum transmit power level determined using the second IAP, and the selected channel or the selected identified channel corresponding to the maximum transmit power level, and terminating the grant request; and determining that the determined maximum transmit power level for the selected identified channel with K bandwidth or the selected channel with a K bandwidth is not greater than the second power threshold level, then transmitting, to the requesting GAA CBSD, the maximum transmit power level determined using the first modified IAP and the selected channel, and terminating the grant request.

Example 4 includes the method of any of Examples 1-3, where if no free frequency spectrum is available, then diminishing bandwidth allocated to the requesting GAA CBSD to equal the bandwidth quota, or if the free frequency spectrum is available, then, determining and transmitting, to the requesting GAA CBSD, (a) the channel which is in the free frequency spectrum and/or (b) the maximum transmit power level for the determined channel for the requesting GAA CBSD comprises: determining a Q bandwidth which is a minimum of a bandwidth threshold and a Y bandwidth, wherein the Y bandwidth is a bandwidth of the channel requested in the grant request by the requesting GAA CBSD; identifying a first set of at least one channel with Q bandwidth within the at least one channel requested in such grant request from the requesting GAA CBSD; identifying a second set of at least one channel with Q bandwidth in the free frequency spectrum; identifying any channel which is an element in both the first set of at least one channel and the second set of at least one channel; determining whether at least one channel has been identified as an element of the first set of at least one channel and the second set of at least one channel; determining that the at least one channel has been identified as an element of the first set of at least one channel and the second set of at least one channel, then determining whether the Q bandwidth is less than the Y bandwidth; determining that the Q bandwidth is not less than the Y bandwidth, then transmitting, the requesting GAA CBSD, authorization to transmit on the channel specified in the grant request and at the maximum transmit power level requested by the requesting GAA CBSD; determining that the Q bandwidth is less than Y bandwidth, then selecting a channel from the identified channels which are elements in both the first set and the second set, transmitting, to the requesting GAA CBSD, an authorization to transmit on the selected channel and at the maximum transmit power level requested by the requesting GAA CBSD, and transmitting, to the requesting GAA CBSD, a termination of the grant request of the requesting GAA CBSD; determining that the at least one channel has not been identified as an element of the first set of at least one channel and the second set of at least one channel, then determining whether the second set of at least one channel includes at least one element; determining that the second set includes at least one element, then selecting a channel from the second set and transmitting, to the requesting GAA CBSD, authorization to transmit on the selected channel and at the maximum transmit power level requested by the requesting GAA CBSD and transmitting, to the requesting GAA CBSD, a termination of the grant request of the requesting GAA CBSD; and determining that the second set does not includes at least one element, then transmitting, to the requesting GAA CBSD, a termination of at least one authorized grant of the requesting GAA CBSD.

Example 5 includes the method of any of Examples 1-4, wherein (i) (a) determining the channel, orthogonal or non-orthogonal if no orthogonal channels exist to channels in which each non-requesting GAA CBSD are presently authorized to transmit, and then diminishing bandwidth in the shared spectrum in which the requesting GAA CBSD is presently authorized to transmit to equal the bandwidth quota, and/or (b) determining the maximum transmit power level for the determined channel, and (ii) transmitting the determined channel and/or the determined maximum transmit power level to the requesting GAA CBSD comprises: identifying a channel in which the recalibrating CBSD is authorized to transmit and which overlaps a same or another channel in which an asserting CBSD is authorized to transmit, wherein overlap means that at least two channels share common frequency spectrum; determining whether a sum bandwidth (Sum BW) is less than the bandwidth quota, wherein Sum BW=Total BW−Asserted BW+Requested BW, wherein the requesting GAA CBSD has been marked a recalibrating CBSD, the asserted bandwidth (Asserted BW) means a bandwidth of frequency spectrum overlapping a channel of an asserting CBSD and a channel of the recalibrating CBSD; interference from the asserting CBSD to the requesting CBSD in overlapping frequency spectrum gave rise to the requesting CBSD to issue a grant request prior to the next to be executed CPAS, and requested bandwidth (Requested BW) means bandwidth requested by the requesting CBSD in its grant request; determining that the sum bandwidth is not less than the bandwidth quota, then determining a first bandwidth (First BW) which can be granted to the recalibrating CBSD, wherein First BW=BW Quota−(Total BW−Asserted BW); determining whether the determined first bandwidth is greater than zero; determining that the first bandwidth is not greater than zero, then transmit a grant request denial to the recalibrating CBSD; determining that the sum bandwidth is less than the bandwidth quota or determining that the first bandwidth is greater than zero, then selecting an alternate channel and determining a maximum transmit power level, and transmitting to the recalibrating CBSD the selected alternate channel and the determined maximum transmit power; transmitting, to the recalibrating CBSD, a grant termination terminating an authorized grant, of the recalibrating CBSD, for identified channel; recalculating a total bandwidth of the recalibrating CBSD accounting for the diminished bandwidth due to the grant termination; determining whether the total bandwidth is greater than the bandwidth quota; and determining that the total bandwidth is greater than the bandwidth quota, then transmitting, to the recalibrating CBSD, termination of at least one authorized grant of the recalibrating CBSD and redetermining the total bandwidth of the recalibrating CBSD.

Example 6 includes a non-transitory computer readable medium storing a program causing at least one processor to execute a process, the process comprising: receiving a grant request (a) specifying a channel in shared frequency spectrum and (b) a maximum transmit power level at which a requesting general authorized access (GAA) citizens broadband radio service device (CBSD) desires to transmit in the specified channel, and transmitted by the requesting GAA CBSD; identifying each edge between a non-requesting GAA CBSD and the requesting GAA CBSD, wherein each non-requesting GAA CBSD is geographically located in a neighborhood centered around the requesting GAA CBSD; determining whether there is at least one edge between the requesting GAA CBSD and at least one non-requesting GAA CBSD; determining that there is the at least one edge between the requesting GAA CBSD and the at least one non-requesting GAA CBSD, then determining, for the requesting GAA CBSD, a bandwidth quota; determining whether a total bandwidth (Total BW) assigned to the requesting GAA CBSD is greater than the bandwidth quota, wherein the total bandwidth assigned to the requesting GAA CBSD is a sum of (a) a bandwidth of each channel in which the requesting GAA CBSD is presently authorized to transmit, and (b) a bandwidth of a channel identified in the grant request; determining that the total bandwidth assigned to the requesting GAA CBSD is not greater than the bandwidth quota, then determining (a) a channel, orthogonal or non-orthogonal if no orthogonal channels exist to channels in which each non-requesting GAA CBSD are presently authorized to transmit and/or (b) a maximum transmit power level for a determined channel, and transmitting the determined channel and/or the determined maximum transmit power level to the requesting GAA CBSD; determining whether the requesting GAA CBSD is marked as a recalibrating CBSD, wherein the recalibrating CBSD is a requesting GAA CBSD that has an edge with a former requesting GAA CBSD geographically located in the neighborhood of the requesting CBSD and wherein the former requesting GAA CBSD received authorization to transmit in a channel (a) in the shared frequency spectrum at a time between a prior executed Coordinated Periodic Activities among SASs (CPAS) and a next to be executed CPAS and (a) which overlaps a channel in which the requesting GAA CBSD is authorized to transmit prior to the requesting GAA CBSD transmitting its grant request; determining that the requesting GAA CBSD is not a recalibrating CBSD, then if no free frequency spectrum is available, then diminishing bandwidth allocated to the requesting GAA CBSD to equal the bandwidth quota, or if the free frequency spectrum is available, then, determining and transmitting, to the requesting GAA CBSD, (a) a channel which is in the free frequency spectrum and/or (b) a maximum transmit power level for the determined channel for requested by the requesting GAA CBSD, wherein the free frequency spectrum means frequency spectrum which is orthogonal to frequency spectrum of any incumbent user(s), incumbent region(s), and any non-requesting GAA CBSD(s) which are geographically located in a neighborhood centered around the requesting GAA CBSD; and determining that the requesting GAA CBSD is a recalibrating CBSD, then (i) (a) determining a channel, orthogonal or non-orthogonal if no orthogonal channels exist to channels in which each non-requesting GAA CBSD are presently authorized to transmit, and then diminishing bandwidth in the shared frequency spectrum in which the requesting GAA CBSD is presently authorized to transmit to equal the bandwidth quota, and/or (b) determining a maximum transmit power level for the determined channel, and (ii) transmitting the determined channel and/or the determined maximum transmit power level to the requesting GAA CBSD; wherein the requesting GAA CBSD is configured to transmit using the determined maximum transmit power level and/or the determined channel.

Example 7 includes the non-transitory computer readable medium of Example 6, wherein determining, for the requesting GAA CBSD, a bandwidth quota comprises: determining a maximum transmit power level, of the requesting GAA CBSD, in each of Z channels, wherein the Z channels are channels in which the requesting GAA CBSD is not prohibited from transmitting by law, regulation, and/or standard; identifying M available channels, of the Z channels, which have a maximum transmit power level greater than a first power threshold level; determining an aggregate bandwidth (AgBW) of the M available channels, wherein the aggregate bandwidth equals a bandwidth per channel multiplied by M; determining a number, of each non-requesting GAA CBSD (NRC) that are authorized to transmit in the aggregate bandwidth of the M available channels, wherein each NRC is authorized to transmit in at least one channel which is orthogonal to the channel specified, in the grant request, by the requesting GAA CBSD; and determining AgBW/(NRC+1).

Example 8 includes the non-transitory computer readable medium of any of Examples 6-7, wherein determining the bandwidth quota comprises determining a maximum transmit power level of requesting GAA CBSD in each of Z channels using a first modified iterative allocation process (IAP); wherein determining (a) the channel, orthogonal or non-orthogonal if no orthogonal channels exist to the at least one channel in which each non-requesting GAA CBSD is presently authorized to transmit and/or (b) the maximum transmit power level for the determined channel, and transmitting the determined channel and/or the determined maximum transmit power level to the requesting GAA CBSD comprises: determining a K bandwidth (K BW), wherein K BW=BW Quota−(BW Requested by Requesting
GAA CBSD+Total BW Assigned to Requesting
GAA CBSD), wherein K is an integer multiple of the bandwidth of each of the Z channels, the BW Quota is the determined bandwidth quota, the BW Requested by Requesting GAA CBSD is a sum of bandwidth of each channel requested by the requesting GAA CBSD in the received grant request, and Total BW Assigned to Requesting GAA CBSD is a sum of bandwidth of each channel for which the requesting GAA CBSD is presently authorized; identify at least one channel with K bandwidth within a frequency spectrum of a channel requested by the requesting GAA CBSD; determine whether at least one of the at least one channel with K bandwidth is within one of M available channels, wherein M available channels, of the Z channels, have a maximum transmit power level greater than a first power threshold level; determining that none of the channels with K bandwidth is within one or more of the M available channels, then identify at least one channel with K bandwidth that is within one or more of the M available channels; for each edge between the requesting GAA CBSD and a set of at least one non-requesting GAA CBSD in the neighborhood centered around the requesting GAA CBSD, determining whether each channel with a K bandwidth is within one or more of the M available channels is orthogonal to at least one channel of the set of at least one non-requesting GAA CBSD, in the neighborhood centered around the requesting GAA CBSD, that has been authorized to transmit; determining that each channel with a K bandwidth is within one or more of the M available channels is not orthogonal to the channels of the non-requesting GAA CBSDs, in the neighborhood centered around the requesting GAA CBSD, that has been authorized to transmit, then, for each edge between the requesting GAA CBSD and a non-requesting GAA CBSD in a neighborhood centered around the requesting GAA CBSD, identifying each channel, with a K bandwidth that is partially co-channel with a channel in which a non-requesting GAA CBSD is authorized to transmit, wherein partially co-channel means that at least two channels share a portion of a same frequency spectrum; determining a maximum transmit power level for each identified channel, wherein the maximum transmit power level of each identified channel is a minimum value of a set of maximum transmit power levels comprising a maximum transmit power level of each Z channel; selecting an identified channel that has a largest maximum transmit power; classifying the requesting GAA CBSD as an asserting CBSD and classifying the non-requesting GAA CBSD that is authorized to transmit in the selected identified channel as a recalibrating CBSD, wherein such classifications are cleared at the next to be executed CPAS; determining that at least one channel with K bandwidth is within one or more of the M available channels, then, for each edge between the requesting GAA CBSD and a non-requesting GAA CBSD geographically located within a neighborhood centered around the GAA CBSD, determining whether any channel with a K bandwidth is orthogonal to channel(s) in which the set of at least one non-requesting GAA CBSD, in the neighborhood centered around the requesting GAA CBSD and with which there is an edge, are authorized to transmit; determining that at least one channel with a K bandwidth is within one or more of the M available channels is orthogonal to the channels of the non-requesting GAA CBSDs, in the neighborhood centered around the requesting GAA CBSD, that has been authorized to transmit, then selecting a channel with a K bandwidth having a largest maximum transmit power level; using a second modified IAP, determining a maximum transmit power level for the selected identified channel with K bandwidth or the selected channel with K bandwidth; determining whether the determined maximum transmit power level for the selected identified channel with K bandwidth or the selected channel with a K bandwidth is greater than a second power threshold level; determining that the determined maximum transmit power level for the selected identified channel with K bandwidth or the selected channel with a K bandwidth is greater than the second power threshold level, then transmitting, to the requesting GAA CBSD, the maximum transmit power level determined using the second IAP, and the selected channel or the selected identified channel corresponding to the maximum transmit power level, and terminating the grant request; and determining that the determined maximum transmit power level for the selected identified channel with K bandwidth or the selected channel with a K bandwidth is not greater than the second power threshold level, then transmitting, to the requesting GAA CBSD, the maximum transmit power level determined using the first modified IAP and the selected channel, and terminating the grant request.

Example 9 includes the non-transitory computer readable medium of any of Examples 6-8, where if no free frequency spectrum is available, then diminishing bandwidth allocated to the requesting GAA CBSD to equal the bandwidth quota, or if the free frequency spectrum is available, then, determining and transmitting, to the requesting GAA CBSD, (a) the channel which is in the free frequency spectrum and/or (b) the maximum transmit power level for the determined channel for the requesting GAA CBSD comprises: determining a Q bandwidth which is a minimum of a bandwidth threshold and a Y bandwidth, wherein the Y bandwidth is a bandwidth of the channel requested in the grant request by the requesting GAA CBSD; identifying a first set of at least one channel with Q bandwidth within the at least one channel requested in such grant request from the requesting GAA CBSD; identifying a second set of at least one channel with Q bandwidth in the free frequency spectrum; identifying any channel which is an element in both the first set of at least one channel and the second set of at least one channel; determining whether at least one channel has been identified as an element of the first set of at least one channel and the second set of at least one channel; determining that the at least one channel has been identified as an element of the first set of at least one channel and the second set of at least one channel, then determining whether the Q bandwidth is less than the Y bandwidth; determining that the Q bandwidth is not less than the Y bandwidth, then transmitting, the requesting GAA CBSD, authorization to transmit on the channel specified in the grant request and at the maximum transmit power level requested by the requesting GAA CBSD; determining that the Q bandwidth is less than Y bandwidth, then selecting a channel from the identified channels which are elements in both the first set and the second set, transmitting, to the requesting GAA CBSD, an authorization to transmit on the selected channel and at the maximum transmit power level requested by the requesting GAA CBSD, and transmitting, to the requesting GAA CBSD, a termination of the grant request of the requesting GAA CBSD; determining that the at least one channel has not been identified as an element of the first set of at least one channel and the second set of at least one channel, then determining whether the second set of at least one channel includes at least one element; determining that the second set includes at least one element, then selecting a channel from the second set and transmitting, to the requesting GAA CBSD, authorization to transmit on the selected channel and at the maximum transmit power level requested by the requesting GAA CBSD and transmitting, to the requesting GAA CBSD, a termination of the grant request of the requesting GAA CBSD; and determining that the second set does not includes at least one element, then transmitting, to the requesting GAA CBSD, a termination of at least one authorized grant of the requesting GAA CBSD.

Example 10 includes the non-transitory computer readable medium of any of Examples 6-9, wherein (i) (a) determining the channel, orthogonal or non-orthogonal if no orthogonal channels exist to channels in which each non-requesting GAA CBSD are presently authorized to transmit, and then diminishing bandwidth in the shared spectrum in which the requesting GAA CBSD is presently authorized to transmit to equal the bandwidth quota, and/or (b) determining the maximum transmit power level for the determined channel, and (ii) transmitting the determined channel and/or the determined maximum transmit power level to the requesting GAA CBSD comprises: identifying a channel in which the recalibrating CBSD is authorized to transmit and which overlaps a same or another channel in which an asserting CBSD is authorized to transmit, wherein overlap means that at least two channels share common frequency spectrum; determining whether a sum bandwidth (Sum BW) is less than the bandwidth quota, wherein $$\text{Sum BW} = \text{Total BW} - \text{Asserted BW} + \text{Requested BW},$$

wherein the requesting GAA CBSD has been marked a recalibrating CBSD, the asserted bandwidth (Asserted BW) means a bandwidth of frequency spectrum overlapping a channel of an asserting CBSD and a channel of the recalibrating CBSD; interference from the asserting CBSD to the requesting CBSD in overlapping frequency spectrum gave rise to the requesting CBSD to issue a grant request prior to the next to be executed CPAS, and requested bandwidth (Requested BW) means bandwidth requested by the requesting CBSD in its grant request; determining that the sum bandwidth is not less than the bandwidth quota, then determining a first bandwidth (First BW) which can be granted to the recalibrating CBSD, wherein First BW=BW Quota−(Total BW−Asserted BW); determining whether the determined first bandwidth is greater than zero; determining that the first bandwidth is not greater than zero, then transmit a grant request denial to the recalibrating CBSD; determining that the sum bandwidth is less than the bandwidth quota or determining that the first bandwidth is greater than zero, then selecting an alternate channel and determining a maximum transmit power level, and transmitting to the recalibrating CBSD the selected alternate channel and the determined maximum transmit power; transmitting, to the recalibrating CBSD, a grant termination terminating an authorized grant, of the recalibrating CBSD, for identified channel; recalculating a total bandwidth of the recalibrating CBSD accounting for the diminished bandwidth due to the grant termination; determining whether the total bandwidth is greater than the bandwidth quota; and determining that the total bandwidth is greater than the bandwidth quota, then transmitting, to the recalibrating CBSD, termination of at least one authorized grant of the recalibrating CBSD and redetermining the total bandwidth of the recalibrating CBSD.

Example 11 includes an apparatus, comprising: processing circuitry configured to: receive a grant request (a) specifying a channel in shared frequency spectrum and (b) a maximum transmit power level at which a requesting general authorized access (GAA) citizens broadband radio service device (CBSD) desires to transmit in the specified channel, and transmitted by the requesting GAA CBSD; identify each edge between a non-requesting GAA CBSD and the requesting GAA CBSD, wherein each non-requesting GAA CBSD is geographically located in a neighborhood centered around the requesting GAA CBSD; determine whether there is at least one edge between the requesting GAA CBSD and at least one non-requesting GAA CBSD; determine that there is the at least one edge between the requesting GAA CBSD and the at least one non-requesting GAA CBSD, then determine, for the requesting GAA CBSD, a bandwidth quota; determine whether a total bandwidth (Total BW) assigned to the requesting GAA CBSD is greater than the bandwidth quota, wherein the total bandwidth assigned to the requesting GAA CBSD is a sum of (a) a bandwidth of each channel in which the requesting GAA CBSD is presently authorized to transmit, and (b) a bandwidth of a channel identified in the grant request; determine that the total bandwidth assigned to the requesting GAA CBSD is not greater than the bandwidth quota, then determine (a) a channel, orthogonal or non-orthogonal if no orthogonal channels exist to channels in which each non-requesting GAA CBSD are presently authorized to transmit and/or (b) a maximum transmit power level for a determined channel, and transmit the determined channel and/or the determined maximum transmit power level to the requesting GAA CBSD; determine whether the requesting GAA CBSD is marked as a recalibrating CBSD, wherein the recalibrating CBSD is a requesting GAA CBSD that has an edge with a former requesting GAA CBSD geographically located in the neighborhood of the requesting CBSD and wherein the former requesting GAA CBSD received authorization to transmit in a channel (a) in the shared frequency spectrum at a time between a prior executed Coordinated Periodic Activities among SASs (CPAS) and a next to be executed CPAS and (a) which overlaps a channel in which the requesting GAA CBSD is authorized to transmit prior to the requesting GAA CBSD transmitting its grant request; determine that the requesting GAA CBSD is not a recalibrating CBSD, then if no free frequency spectrum is available, then diminish bandwidth allocated to the requesting GAA CBSD to equal the bandwidth quota, or if the free frequency spectrum is available, then, determine and transmit, to the requesting GAA CBSD, (a) a channel which is in the free frequency spectrum and/or (b) a maximum transmit power level for the determined channel for requested by the requesting GAA CBSD, wherein the free frequency spectrum means frequency spectrum which is orthogonal to frequency spectrum of any incumbent user(s), incumbent region(s), and any non-requesting GAA CBSD(s) which are geographically located in a neighborhood centered around the requesting GAA CBSD; and determine that the requesting GAA CBSD is a recalibrating CBSD, then (i) (a) determine a channel, orthogonal or non-orthogonal if no orthogonal channels exist to channels in which each non-requesting GAA CBSD are presently authorized to transmit, and then diminish bandwidth in the shared frequency spectrum in which the requesting GAA CBSD is presently authorized to transmit to equal the bandwidth quota, and/or (b) determine a maximum transmit power level for the determined channel, and (ii) transmit the determined channel and/or the determined maximum transmit power level to the requesting GAA CBSD; wherein the requesting GAA CBSD is configured to transmit using the determined maximum transmit power level and/or the determined channel.

Example 12 includes the apparatus of Example 11, wherein determine, for the requesting GAA CBSD, a bandwidth quota comprises: determine a maximum transmit power level, of the requesting GAA CBSD, in each of Z channels, wherein the Z channels are channels in which the requesting GAA CBSD is not prohibited from transmitting by law, regulation, and/or standard; identify M available channels, of the Z channels, which have a maximum transmit power level greater than a first power threshold level; determine an aggregate bandwidth (AgBW) of the M available channels, wherein the aggregate bandwidth equals a bandwidth per channel multiplied by M; determine a number, of each non-requesting GAA CBSD (NRC) that are authorized to transmit in the aggregate bandwidth of the M available channels, wherein each NRC is authorized to transmit in at least one channel which is orthogonal to the channel specified, in the grant request, by the requesting GAA CBSD; and determine AgBW/(NRC+1).

Example 13 includes the apparatus of any of Examples 11-12, wherein determining the bandwidth quota comprises determine a maximum transmit power level of requesting GAA CBSD in each of Z channels using a first modified iterative allocation process (IAP); wherein determine (a) the channel, orthogonal or non-orthogonal if no orthogonal channels exist to the at least one channel in which each non-requesting GAA CBSD is presently authorized to transmit and/or (b) the maximum transmit power level for the determined channel, and transmit the determined channel and/or the determined maximum transmit power level to the requesting GAA CBSD comprises: determine a K bandwidth (K BW), wherein K BW=BW Quota−(BW Requested by Requesting GAA CBSD+Total BW Assigned to Requesting GAA CBSD), wherein K is an integer multiple of the bandwidth of each of the Z channels, the BW Quota is the determined bandwidth quota, the BW Requested by Requesting GAA CBSD is a sum of bandwidth of each channel requested by the requesting GAA CBSD in the received grant request, and Total BW Assigned to Requesting GAA CBSD is a sum of bandwidth of each channel for which the requesting GAA CBSD is presently authorized; identify at least one channel with K bandwidth within a frequency spectrum of a channel requested by the requesting GAA CBSD; determine whether at least one of the at least one channel with K bandwidth is within one of M available channels, wherein M available channels, of the Z channels, have a maximum transmit power level greater than a first power threshold level; determine that none of the channels with K bandwidth is within one or more of the M available channels, then identify at least one channel with K bandwidth that is within one or more of the M available channels; for each edge between the requesting GAA CBSD and a set of at least one non-requesting GAA CBSD in the neighborhood centered around the requesting GAA CBSD, determine whether each channel with a K bandwidth is within one or more of the M available channels is orthogonal to at least one channel of the set of at least one non-requesting GAA CBSD, in the neighborhood centered around the requesting GAA CBSD, that has been authorized to transmit; determine that each channel with a K bandwidth is within one or more of the M available channels is not orthogonal to the channels of the non-requesting GAA CBSDs, in the neighborhood centered around the requesting GAA CBSD, that has been authorized to transmit, then, for each edge between the requesting GAA CBSD and a non-requesting GAA CBSD in a neighborhood centered around the requesting GAA CBSD, identify each channel, with a K bandwidth that is partially co-channel with a channel in which a non-requesting GAA CBSD is authorized to transmit, wherein partially co-channel means that at least two channels share a portion of a same frequency spectrum; determine a maximum transmit power level for each identified channel, wherein the maximum transmit power level of each identified channel is a minimum value of a set of maximum transmit power levels comprising a maximum transmit power level of each Z channel; select an identified channel that has a largest maximum transmit power; classify the requesting GAA CBSD as an asserting CBSD and classifying the non-requesting GAA CBSD that is authorized to transmit in the selected identified channel as a recalibrating CBSD, wherein such classifications are cleared at the next to be executed CPAS; determine that at least one channel with K bandwidth is within one or more of the M available channels, then, for each edge between the requesting GAA CBSD and a non-requesting GAA CBSD geographically located within a neighborhood centered around the requesting GAA CBSD, determine whether any channel with a K bandwidth is orthogonal to channel(s) in which the set of at least one non-requesting GAA CBSD, in the neighborhood centered around the requesting GAA CBSD and with which there is an edge, are authorized to transmit; determine that at least one channel with a K bandwidth is within one or more of the M available channels is orthogonal to the channels of the non-requesting GAA CBSDs, in the neighborhood centered around the requesting GAA CBSD, that has been authorized to transmit, then selecting a channel with a K bandwidth having a largest maximum transmit power level; using a second modified IAP, determine a maximum transmit power level for the selected identified channel with K bandwidth or the selected channel with K bandwidth; determine whether the determined maximum transmit power level for the selected identified channel with K bandwidth or the selected channel with a K bandwidth is greater than a second power threshold level; determine that the determined maximum transmit power level for the selected identified channel with K bandwidth or the selected channel with a K bandwidth is greater than the second power threshold level, then transmit, to the requesting GAA CBSD, the maximum transmit power level determined using the second IAP, and the selected channel or the selected identified channel corresponding to the maximum transmit power level, and terminate the grant request; and determine that the determined maximum transmit power level for the selected identified channel with K bandwidth or the selected channel with a K bandwidth is not greater than the second power threshold level, then transmit, to the requesting GAA CBSD, the maximum transmit power level determined using the first modified IAP and the selected channel, and terminate the grant.

Example 14 includes the apparatus of any of Examples 11-13, where if no free frequency spectrum is available, then diminish bandwidth allocated to the requesting GAA CBSD to equal the bandwidth quota, or if the free frequency spectrum is available, then, determine and transmit, to the requesting GAA CBSD, (a) the channel which is in the free frequency spectrum and/or (b) the maximum transmit power level for the determined channel for the requesting GAA CBSD comprises: determine a Q bandwidth which is a minimum of a bandwidth threshold and a Y bandwidth, wherein the Y bandwidth is a bandwidth of the channel requested in the grant request by the requesting GAA CBSD; identify a first set of at least one channel with Q bandwidth within the at least one channel requested in such grant request from the requesting GAA CBSD; identify a second set of at least one channel with Q bandwidth in the free frequency spectrum; identify any channel which is an element in both the first set of at least one channel and the second set of at least one channel; determine whether at least one channel has been identified as an element of the first set of at least one channel and the second set of at least one channel; determine that the at least one channel has been identified as an element of the first set of at least one channel and the second set of at least one channel, then determine whether the Q bandwidth is less than the Y bandwidth; determine that the Q bandwidth is not less than the Y bandwidth, then transmit, the requesting GAA CBSD, authorization to transmit on the channel specified in the grant request and at the maximum transmit power level requested by the requesting GAA CBSD; determine that the Q bandwidth is less than Y bandwidth, then select a channel from the identified channels which are elements in both the first set and the second set, transmitting, to the requesting GAA CBSD, an authorization to transmit on the selected channel and at the maximum transmit power level requested by the requesting GAA CBSD, and transmitting, to the requesting GAA CBSD, a termination of the grant request of the requesting GAA CBSD; determine that the at least one channel has not been identified as an element of the first set of at least one channel and the second set of at least one channel, then determine whether the second set of at least one channel includes at least one element; determine that the second set includes at least one element, then select a channel from the second set and transmit, to the requesting GAA CBSD, authorization to transmit on the selected channel and at the maximum transmit power level requested by the requesting GAA CBSD and transmit, to the requesting GAA CBSD, a termination of the grant request of the requesting GAA CBSD; and determine that the second set does not includes at least one element, then transmit, to the requesting GAA CBSD, a termination of at least one authorized grant of the requesting GAA CBSD.

Example 15 includes the apparatus of any of Examples 11-14, wherein (i) (a) determine the channel, orthogonal or non-orthogonal if no orthogonal channels exist to channels in which each non-requesting GAA CBSD are presently authorized to transmit, and then diminishing bandwidth in the shared spectrum in which the requesting GAA CBSD is presently authorized to transmit to equal the bandwidth quota, and/or (b) determine the maximum transmit power level for the determined channel, and (ii) transmit the determined channel and/or the determined maximum transmit power level to the requesting GAA CBSD comprises: identify a channel in which the recalibrating CBSD is authorized to transmit and which overlaps a same or another channel in which an asserting CBSD is authorized to transmit, wherein overlap means that at least two channels share common frequency spectrum; determine whether a sum bandwidth (Sum BW) is less than the bandwidth quota, wherein Sum BW=Total BW−Asserted BW+Requested BW, wherein the requesting GAA CBSD has been marked a recalibrating CBSD, the asserted bandwidth (Asserted BW) means a bandwidth of frequency spectrum overlapping a channel of an asserting CBSD and a channel of the recalibrating CBSD; interference from the asserting CBSD to the requesting CBSD in overlapping frequency spectrum gave rise to the requesting CBSD to issue a grant request prior to the next to be executed CPAS, and requested bandwidth (Requested BW) means bandwidth requested by the requesting CBSD in its grant request; determine that the sum bandwidth is not less than the bandwidth quota, then determining a first bandwidth (First BW) which can be granted to the recalibrating CBSD, wherein First BW=BW Quota−(Total BW−Asserted BW); determine whether the determined first bandwidth is greater than zero; determine that the first bandwidth is not greater than zero, then transmit a grant request denial to the recalibrating CBSD; determine that the sum bandwidth is less than the bandwidth quota or determine that the first bandwidth is greater than zero, then select an alternate channel and determining a maximum transmit power level, and transmit to the recalibrating CBSD the selected alternate channel and the determined maximum transmit power; transmit, to the recalibrating CBSD, a grant termination terminating an authorized grant, of the recalibrating CBSD, for identified channel; recalculate a total bandwidth of the recalibrating CBSD accounting for the diminished bandwidth due to the grant termination; determine whether the total bandwidth is greater than the bandwidth quota; and determine that the total bandwidth is greater than the bandwidth quota, then transmit, to the recalibrating CBSD, termination of at least one authorized grant of the recalibrating CBSD and redetermine the total bandwidth of the recalibrating CBSD.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A method, comprising:
receiving a grant request (a) specifying a channel in shared frequency spectrum and (b) a maximum transmit power level at which a requesting general authorized access (GAA) citizens broadband radio service device (CBSD) desires to transmit in the specified channel, and transmitted by the requesting GAA CBSD;
identifying each edge between a non-requesting GAA CBSD and the requesting GAA CBSD, wherein each non-requesting GAA CBSD is geographically located in a neighborhood centered around the requesting GAA CBSD;
determining whether there is at least one edge between the requesting GAA CBSD and at least one non-requesting GAA CBSD;
determining that there is the at least one edge between the requesting GAA CBSD and the at least one non-requesting GAA CBSD, then determining, for the requesting GAA CBSD, a bandwidth quota;
determining whether a total bandwidth (Total BW) assigned to the requesting GAA CBSD is greater than the bandwidth quota, wherein the total bandwidth assigned to the requesting GAA CBSD is a sum of (a) a bandwidth of each channel in which the requesting GAA CBSD is presently authorized to transmit, and (b) a bandwidth of a channel identified in the grant request;

determining that the total bandwidth assigned to the requesting GAA CBSD is not greater than the bandwidth quota, then determining (a) a channel, orthogonal or non-orthogonal if no orthogonal channels exist to channels in which each non-requesting GAA CBSD are presently authorized to transmit and/or (b) a maximum transmit power level for a determined channel, and transmitting the determined channel and/or the determined maximum transmit power level to the requesting GAA CBSD;

determining whether the requesting GAA CBSD is marked as a recalibrating CBSD, wherein the recalibrating CBSD is a requesting GAA CBSD that has an edge with a former requesting GAA CBSD geographically located in the neighborhood centered around the requesting CBSD and wherein the former requesting GAA CBSD received authorization to transmit in a channel (a) in the shared frequency spectrum at a time between a prior executed Coordinated Periodic Activities among SASs (CPAS) and a next to be executed CPAS and (a) which overlaps a channel in which the requesting GAA CBSD is authorized to transmit prior to the requesting GAA CBSD transmitting its grant request;

determining that the requesting GAA CBSD is not a recalibrating CBSD, then if no free frequency spectrum is available, then diminishing bandwidth allocated to the requesting GAA CBSD to equal the bandwidth quota, or if the free frequency spectrum is available, then, determining and transmitting, to the requesting GAA CBSD, (a) a channel which is in the free frequency spectrum and/or (b) a maximum transmit power level for the determined channel for requested by the requesting GAA CBSD, wherein the free frequency spectrum means frequency spectrum which is orthogonal to frequency spectrum of any incumbent user(s), incumbent region(s), and any non-requesting GAA CBSD(s) which are geographically located in a neighborhood centered around the requesting GAA CBSD; and determining that the requesting GAA CBSD is a recalibrating CBSD, then (i) (a) determining a channel, orthogonal or non-orthogonal if no orthogonal channels exist to channels in which each non-requesting GAA CBSD are presently authorized to transmit, and then diminishing bandwidth in the shared frequency spectrum in which the requesting GAA CBSD is presently authorized to transmit to equal the bandwidth quota, and/or (b) determining a maximum transmit power level for the determined channel, and (ii) transmitting the determined channel and/or the determined maximum transmit power level to the requesting GAA CBSD;

wherein the requesting GAA CBSD is configured to transmit using the determined maximum transmit power level and/or the determined channel.

2. The method of claim 1, wherein determining, for the requesting GAA CBSD, a bandwidth quota comprises:

determining a maximum transmit power level, of the requesting GAA CBSD, in each of Z channels, wherein the Z channels are channels in which the requesting GAA CBSD is not prohibited from transmitting by law, regulation, and/or standard;

identifying M available channels, of the Z channels, which have a maximum transmit power level greater than a first power threshold level;

determining an aggregate bandwidth (AgBW) of the M available channels, wherein the aggregate bandwidth equals a bandwidth per channel multiplied by M;

determining a number, of each non-requesting GAA CBSD (NRC) that are authorized to transmit in the aggregate bandwidth of the M available channels, wherein each NRC is authorized to transmit in at least one channel which is orthogonal to the channel specified, in the grant request, by the requesting GAA CBSD; and determining AgBW/(NRC+1).

3. The method of claim 1, wherein determining the bandwidth quota comprises determining a maximum transmit power level of requesting GAA CBSD in each of Z channels using a first modified iterative allocation process (IAP);

wherein determining (a) the channel, orthogonal or non-orthogonal if no orthogonal channels exist to the at least one channel in which each non-requesting GAA CBSD is presently authorized to transmit and/or (b) the maximum transmit power level for the determined channel, and transmitting the determined channel and/or the determined maximum transmit power level to the requesting GAA CBSD comprises:

determining a K bandwidth (K BW), wherein

K BW=BW Quota−(BW Requested by Requesting GAA CBSD+Total BW Assigned to Requesting GAA CBSD), wherein K is an integer multiple of the bandwidth of each of the Z channels, the BW Quota is the determined bandwidth quota, the BW Requested by Requesting GAA CBSD is a sum of bandwidth of each channel requested by the requesting GAA CBSD in the received grant request, and Total BW Assigned to Requesting GAA CBSD is a sum of bandwidth of each channel for which the requesting GAA CBSD is presently authorized;

identify at least one channel with K bandwidth within a frequency spectrum of a channel requested by the requesting GAA CBSD;

determine whether at least one of the at least one channel with K bandwidth is within one of M available channels, wherein M available channels, of the Z channels, have a maximum transmit power level greater than a first power threshold level;

determining that none of the channels with K bandwidth is within one or more of the M available channels, then identify at least one channel with K bandwidth that is within one or more of the M available channels;

for each edge between the requesting GAA CBSD and a set of at least one non-requesting GAA CBSD in the neighborhood centered around the requesting GAA CBSD, determining whether each channel with a K bandwidth is within one or more of the M available channels is orthogonal to at least one channel of the set of at least one non-requesting GAA CBSD, in the neighborhood centered around the requesting GAA CBSD, that has been authorized to transmit;

determining that each channel with a K bandwidth is within one or more of the M available channels is not orthogonal to the channels of the non-requesting GAA CBSDs, in the neighborhood centered around the requesting GAA CBSD, that has been authorized to transmit, then, for each edge between the requesting GAA CBSD and a non-requesting GAA CBSD in the neighborhood centered around the requesting GAA CBSD, identifying each channel, with a K bandwidth that is partially co-channel with a channel in which a non-requesting GAA CBSD is authorized to transmit, wherein partially co-channel means that at least two channels share a portion of a same frequency spectrum;

determining a maximum transmit power level for each identified channel, wherein the maximum transmit power level of each identified channel is a minimum value of a set of maximum transmit power levels comprising a maximum transmit power level of each Z channel;

selecting an identified channel that has a largest maximum transmit power;

classifying the requesting GAA CBSD as an asserting CBSD and classifying the non-requesting GAA CBSD that is authorized to transmit in the selected identified channel as a recalibrating CBSD, wherein such classifications are cleared at the next to be executed CPAS;

determining that at least one channel with K bandwidth is within one or more of the M available channels, then, for each edge between the requesting GAA CBSD and a non-requesting GAA CBSD geographically located within a neighborhood centered around the requesting GAA CBSD, determining whether any channel with a K bandwidth is orthogonal to channel(s) in which the set of at least one non-requesting GAA CBSD, in the neighborhood centered around the requesting GAA CBSD and with which there is an edge, are authorized to transmit;

determining that at least one channel with a K bandwidth is within one or more of the M available channels is orthogonal to the channels of the non-requesting GAA CBSDs, in the neighborhood centered around the requesting GAA CBSD, that has been authorized to transmit, then selecting a channel with a K bandwidth having a largest maximum transmit power level;

using a second modified IAP, determining a maximum transmit power level for the selected identified channel with K bandwidth or the selected channel with K bandwidth;

determining whether the determined maximum transmit power level for the selected identified channel with K bandwidth or the selected channel with a K bandwidth is greater than a second power threshold level;

determining that the determined maximum transmit power level for the selected identified channel with K bandwidth or the selected channel with a K bandwidth is greater than the second power threshold level, then transmitting, to the requesting GAA CBSD, the maximum transmit power level determined using the second IAP, and the selected channel or the selected identified channel corresponding to the maximum transmit power level, and terminating the grant request; and determining that the determined maximum transmit power level for the selected identified channel with K bandwidth or the selected channel with a K bandwidth is not greater than the second power threshold level, then transmitting, to the requesting GAA CBSD, the maximum transmit power level determined using the first modified IAP and the selected channel, and terminating the grant request.

4. The method of claim 1, where if no free frequency spectrum is available, then diminishing bandwidth allocated to the requesting GAA CBSD to equal the bandwidth quota, or if the free frequency spectrum is available, then, determining and transmitting, to the requesting GAA CBSD, (a) the channel which is in the free frequency spectrum and/or (b) the maximum transmit power level for the determined channel for the requesting GAA CBSD comprises:

determining a Q bandwidth which is a minimum of a bandwidth threshold and a Y bandwidth, wherein the Y bandwidth is a bandwidth of the channel requested in the grant request by the requesting GAA CBSD;

identifying a first set of at least one channel with Q bandwidth within the at least one channel requested in such grant request from the requesting GAA CBSD;

identifying a second set of at least one channel with Q bandwidth in the free frequency spectrum;

identifying any channel which is an element in both the first set of at least one channel and the second set of at least one channel;

determining whether at least one channel has been identified as an element of the first set of at least one channel and the second set of at least one channel;

determining that the at least one channel has been identified as an element of the first set of at least one channel and the second set of at least one channel, then determining whether the Q bandwidth is less than the Y bandwidth;

determining that the Q bandwidth is not less than the Y bandwidth, then transmitting, the requesting GAA CBSD, authorization to transmit on the channel specified in the grant request and at the maximum transmit power level requested by the requesting GAA CBSD;

determining that the Q bandwidth is less than Y bandwidth, then selecting a channel from the identified channels which are elements in both the first set and the second set, transmitting, to the requesting GAA CBSD, an authorization to transmit on the selected channel and at the maximum transmit power level requested by the requesting GAA CBSD, and transmitting, to the requesting GAA CBSD, a termination of the grant request of the requesting GAA CBSD;

determining that the at least one channel has not been identified as an element of the first set of at least one channel and the second set of at least one channel, then determining whether the second set of at least one channel includes at least one element;

determining that the second set includes at least one element, then selecting a channel from the second set and transmitting, to the requesting GAA CBSD, authorization to transmit on the selected channel and at the maximum transmit power level requested by the requesting GAA CBSD and transmitting, to the requesting GAA CBSD, a termination of the grant request of the requesting GAA CBSD; and determining that the second set does not includes at least one element, then transmitting, to the requesting GAA CBSD, a termination of at least one authorized grant of the requesting GAA CBSD.

5. The method of claim 1, wherein (i) (a) determining the channel, orthogonal or non-orthogonal if no orthogonal channels exist to channels in which each non-requesting GAA CBSD are presently authorized to transmit, and then diminishing bandwidth in the shared spectrum in which the requesting GAA CBSD is presently authorized to transmit to equal the bandwidth quota, and/or (b) determining the maximum transmit power level for the determined channel, and (ii) transmitting the determined channel and/or the determined maximum transmit power level to the requesting GAA CBSD comprises:

identifying a channel in which the recalibrating CBSD is authorized to transmit and which overlaps a same or another channel in which an asserting CBSD is authorized to transmit, wherein overlap means that at least two channels share common frequency spectrum;

determining whether a sum bandwidth (Sum BW) is less than the bandwidth quota, wherein Sum BW=Total BW−Asserted BW+Requested BW, wherein the requesting GAA CBSD has been marked a recalibrating CBSD, the asserted bandwidth (Asserted BW) means a bandwidth of frequency spectrum overlapping a channel of an asserting CBSD and a channel of the recalibrating CBSD; interference from the asserting CBSD to the requesting CBSD in overlapping frequency spectrum gave rise to the requesting CBSD to issue a grant request prior to the next to be executed CPAS, and requested bandwidth (Requested BW) means bandwidth requested by the requesting CBSD in its grant request;

determining that the sum bandwidth is not less than the bandwidth quota, then determining a first bandwidth (First BW) which can be granted to the recalibrating CBSD, wherein First BW=BW Quota−(Total BW−Asserted BW);

determining whether the determined first bandwidth is greater than zero;

determining that the first bandwidth is not greater than zero, then transmit a grant request denial to the recalibrating CBSD;

determining that the sum bandwidth is less than the bandwidth quota or determining that the first bandwidth is greater than zero, then selecting an alternate channel and determining a maximum transmit power level, and transmitting to the recalibrating CBSD the selected alternate channel and the determined maximum transmit power;

transmitting, to the recalibrating CBSD, a grant termination terminating an authorized grant, of the recalibrating CBSD, for identified channel;

recalculating a total bandwidth of the recalibrating CBSD accounting for the diminished bandwidth due to the grant termination;

determining whether the total bandwidth is greater than the bandwidth quota; and determining that the total bandwidth is greater than the bandwidth quota, then transmitting, to the recalibrating CBSD, termination of at least one authorized grant of the recalibrating CBSD and redetermining the total bandwidth of the recalibrating CBSD.

6. A non-transitory computer readable medium storing a program causing at least one processor to execute a process, the process comprising:

receiving a grant request (a) specifying a channel in shared frequency spectrum and (b) a maximum transmit power level at which a requesting general authorized access (GAA) citizens broadband radio service device (CBSD) desires to transmit in the specified channel, and transmitted by the requesting GAA CBSD;

identifying each edge between a non-requesting GAA CBSD and the requesting GAA CBSD, wherein each non-requesting GAA CBSD is geographically located in a neighborhood centered around the requesting GAA CBSD;

determining whether there is at least one edge between the requesting GAA CBSD and at least one non-requesting GAA CBSD;

determining that there is the at least one edge between the requesting GAA CBSD and the at least one non-requesting GAA CBSD, then determining, for the requesting GAA CBSD, a bandwidth quota;

determining whether a total bandwidth (Total BW) assigned to the requesting GAA CBSD is greater than the bandwidth quota, wherein the total bandwidth assigned to the requesting GAA CBSD is a sum of (a) a bandwidth of each channel in which the requesting GAA CBSD is presently authorized to transmit, and (b) a bandwidth of a channel identified in the grant request;

determining that the total bandwidth assigned to the requesting GAA CBSD is not greater than the bandwidth quota, then determining (a) a channel, orthogonal or non-orthogonal if no orthogonal channels exist to channels in which each non-requesting GAA CBSD are presently authorized to transmit and/or (b) a maximum transmit power level for a determined channel, and transmitting the determined channel and/or the determined maximum transmit power level to the requesting GAA CBSD;

determining whether the requesting GAA CBSD is marked as a recalibrating CBSD, wherein the recalibrating CBSD is a requesting GAA CBSD that has an edge with a former requesting GAA CBSD geographically located in the neighborhood centered around the requesting CBSD and wherein the former requesting GAA CBSD received authorization to transmit in a channel (a) in the shared frequency spectrum at a time between a prior executed Coordinated Periodic Activities among SASs (CPAS) and a next to be executed CPAS and (a) which overlaps a channel in which the requesting GAA CBSD is authorized to transmit prior to the requesting GAA CBSD transmitting its grant request;

determining that the requesting GAA CBSD is not a recalibrating CBSD, then if no free frequency spectrum is available, then diminishing bandwidth allocated to the requesting GAA CBSD to equal the bandwidth quota, or if the free frequency spectrum is available, then, determining and transmitting, to the requesting GAA CBSD, (a) a channel which is in the free frequency spectrum and/or (b) a maximum transmit power level for the determined channel for requested by the requesting GAA CBSD, wherein the free frequency spectrum means frequency spectrum which is orthogonal to frequency spectrum of any incumbent user(s), incumbent region(s), and any non-requesting GAA CBSD(s) which are geographically located in the neighborhood centered around the requesting GAA CBSD; and determining that the requesting GAA CBSD is a recalibrating CBSD, then (i) (a) determining a channel, orthogonal or non-orthogonal if no orthogonal channels exist to channels in which each non-requesting GAA CBSD are presently authorized to transmit, and then diminishing bandwidth in the shared frequency spectrum in which the requesting GAA CBSD is presently authorized to transmit to equal the bandwidth quota, and/or (b) determining a maximum transmit power level for the determined channel, and (ii) transmitting the determined channel and/or the determined maximum transmit power level to the requesting GAA CBSD;

wherein the requesting GAA CBSD is configured to transmit using the determined maximum transmit power level and/or the determined channel.

7. The non-transitory computer readable medium of claim 6, wherein determining, for the requesting GAA CBSD, a bandwidth quota comprises:
 determining a maximum transmit power level, of the requesting GAA CBSD, in each of Z channels, wherein the Z channels are channels in which the requesting GAA CBSD is not prohibited from transmitting by law, regulation, and/or standard;
 identifying M available channels, of the Z channels, which have a maximum transmit power level greater than a first power threshold level;
 determining an aggregate bandwidth (AgBW) of the M available channels, wherein the aggregate bandwidth equals a bandwidth per channel multiplied by M;
 determining a number, of each non-requesting GAA CBSD (NRC) that are authorized to transmit in the aggregate bandwidth of the M available channels, wherein each NRC is authorized to transmit in at least one channel which is orthogonal to the channel specified, in the grant request, by the requesting GAA CBSD; and
 determining AgBW/(NRC+1).

8. The non-transitory computer readable medium of claim 6, wherein determining the bandwidth quota comprises determining a maximum transmit power level of requesting GAA CBSD in each of Z channels using a first modified iterative allocation process (IAP);
 wherein determining (a) the channel, orthogonal or non-orthogonal if no orthogonal channels exist to the at least one channel in which each non-requesting GAA CBSD is presently authorized to transmit and/or (b) the maximum transmit power level for the determined channel, and transmitting the determined channel and/or the determined maximum transmit power level to the requesting GAA CBSD comprises:
 determining a K bandwidth (K BW), wherein K BW=BW Quota−(BW Requested by Requesting GAA CBSD+Total BW Assigned to Requesting GAA CBSD), wherein K is an integer multiple of the bandwidth of each of the Z channels, the BW Quota is the determined bandwidth quota, the BW Requested by Requesting GAA CBSD is a sum of bandwidth of each channel requested by the requesting GAA CBSD in the received grant request, and Total BW Assigned to Requesting GAA CBSD is a sum of bandwidth of each channel for which the requesting GAA CBSD is presently authorized;
 identify at least one channel with K bandwidth within a frequency spectrum of a channel requested by the requesting GAA CBSD;
 determine whether at least one of the at least one channel with K bandwidth is within one of M available channels, wherein M available channels, of the Z channels, have a maximum transmit power level greater than a first power threshold level;
 determining that none of the channels with K bandwidth is within one or more of the M available channels, then identify at least one channel with K bandwidth that is within one or more of the M available channels;
 for each edge between the requesting GAA CBSD and a set of at least one non-requesting GAA CBSD in the neighborhood centered around the requesting GAA CBSD, determining whether each channel with a K bandwidth is within one or more of the M available channels is orthogonal to at least one channel of the set of at least one non-requesting GAA CBSD, in the neighborhood centered around the requesting GAA CBSD, that has been authorized to transmit;
 determining that each channel with a K bandwidth is within one or more of the M available channels is not orthogonal to the channels of the non-requesting GAA CBSDs, in the neighborhood centered around the requesting GAA CBSD, that has been authorized to transmit, then, for each edge between the requesting GAA CBSD and a non-requesting GAA CBSD in the neighborhood centered around the requesting GAA CBSD, identifying each channel, with a K bandwidth that is partially co-channel with a channel in which a non-requesting GAA CBSD is authorized to transmit, wherein partially co-channel means that at least two channels share a portion of a same frequency spectrum;
 determining a maximum transmit power level for each identified channel, wherein the maximum transmit power level of each identified channel is a minimum value of a set of maximum transmit power levels comprising a maximum transmit power level of each Z channel;
 selecting an identified channel that has a largest maximum transmit power;
 classifying the requesting GAA CBSD as an asserting CBSD and classifying the non-requesting GAA CBSD that is authorized to transmit in the selected identified channel as a recalibrating CBSD, wherein such classifications are cleared at the next to be executed CPAS;
 determining that at least one channel with K bandwidth is within one or more of the M available channels, then, for each edge between the requesting GAA CBSD and a non-requesting GAA CBSD geographically located within the neighborhood centered around the requesting GAA CBSD, determining whether any channel with a K bandwidth is orthogonal to channel(s) in which the set of at least one non-requesting GAA CBSD, in the neighborhood centered around the requesting GAA CBSD and with which there is an edge, are authorized to transmit;
 determining that at least one channel with a K bandwidth is within one or more of the M available channels is orthogonal to the channels of the non-requesting GAA CBSDs, in the neighborhood centered around the requesting GAA CBSD, that has been authorized to transmit, then selecting a channel with a K bandwidth having a largest maximum transmit power level;
 using a second modified IAP, determining a maximum transmit power level for the selected identified channel with K bandwidth or the selected channel with K bandwidth;
 determining whether the determined maximum transmit power level for the selected identified channel with K bandwidth or the selected channel with a K bandwidth is greater than a second power threshold level;
 determining that the determined maximum transmit power level for the selected identified channel with K bandwidth or the selected channel with a K bandwidth is greater than the second power threshold level, then transmitting, to the requesting GAA CBSD, the maximum transmit power level determined using the second IAP, and the selected channel or the selected identified channel corresponding to the maximum transmit power level, and terminating the grant request; and
 determining that the determined maximum transmit power level for the selected identified channel with K bandwidth or the selected channel with a K bandwidth is not greater than the second power threshold level, then transmitting, to the requesting GAA CBSD, the maximum transmit power level determined using the first modified IAP and the selected channel, and terminating the grant request.

9. The non-transitory computer readable medium of claim 6, where if no free frequency spectrum is available, then diminishing bandwidth allocated to the requesting GAA CBSD to equal the bandwidth quota, or if the free frequency spectrum is available, then, determining and transmitting, to the requesting GAA CBSD, (a) the channel which is in the free frequency spectrum and/or (b) the maximum transmit power level for the determined channel for the requesting GAA CBSD comprises:
  determining a Q bandwidth which is a minimum of a bandwidth threshold and a Y bandwidth, wherein the Y bandwidth is a bandwidth of the channel requested in the grant request by the requesting GAA CBSD;
  identifying a first set of at least one channel with Q bandwidth within the at least one channel requested in such grant request from the requesting GAA CBSD;
  identifying a second set of at least one channel with Q bandwidth in the free frequency spectrum;
  identifying any channel which is an element in both the first set of at least one channel and the second set of at least one channel;
  determining whether at least one channel has been identified as an element of the first set of at least one channel and the second set of at least one channel;
  determining that the at least one channel has been identified as an element of the first set of at least one channel and the second set of at least one channel, then determining whether the Q bandwidth is less than the Y bandwidth;
  determining that the Q bandwidth is not less than the Y bandwidth, then transmitting, the requesting GAA CBSD, authorization to transmit on the channel specified in the grant request and at the maximum transmit power level requested by the requesting GAA CBSD;
  determining that the Q bandwidth is less than Y bandwidth, then selecting a channel from the identified channels which are elements in both the first set and the second set, transmitting, to the requesting GAA CBSD, an authorization to transmit on the selected channel and at the maximum transmit power level requested by the requesting GAA CBSD, and transmitting, to the requesting GAA CBSD, a termination of the grant request of the requesting GAA CBSD;
  determining that the at least one channel has not been identified as an element of the first set of at least one channel and the second set of at least one channel, then determining whether the second set of at least one channel includes at least one element;
  determining that the second set includes at least one element, then selecting a channel from the second set and transmitting, to the requesting GAA CBSD, authorization to transmit on the selected channel and at the maximum transmit power level requested by the requesting GAA CBSD and transmitting, to the requesting GAA CBSD, a termination of the grant request of the requesting GAA CBSD; and
  determining that the second set does not includes at least one element, then transmitting, to the requesting GAA CBSD, a termination of at least one authorized grant of the requesting GAA CBSD.

10. The non-transitory computer readable medium of claim 6, wherein (i) (a) determining the channel, orthogonal or non-orthogonal if no orthogonal channels exist to channels in which each non-requesting GAA CBSD are presently authorized to transmit, and then diminishing bandwidth in the shared spectrum in which the requesting GAA CBSD is presently authorized to transmit to equal the bandwidth quota, and/or (b) determining the maximum transmit power level for the determined channel, and (ii) transmitting the determined channel and/or the determined maximum transmit power level to the requesting GAA CBSD comprises:
  identifying a channel in which the recalibrating CBSD is authorized to transmit and which overlaps a same or another channel in which an asserting CBSD is authorized to transmit, wherein overlap means that at least two channels share common frequency spectrum;
  determining whether a sum bandwidth (Sum BW) is less than the bandwidth quota, wherein Sum BW=Total BW−Asserted BW+Requested BW,
  wherein the requesting GAA CBSD has been marked a recalibrating CBSD, the asserted bandwidth (Asserted BW) means a bandwidth of frequency spectrum overlapping a channel of an asserting CBSD and a channel of the recalibrating CBSD; interference from the asserting CBSD to the requesting CBSD in overlapping frequency spectrum gave rise to the requesting CBSD to issue a grant request prior to the next to be executed CPAS, and requested bandwidth (Requested BW) means bandwidth requested by the requesting CBSD in its grant request;
  determining that the sum bandwidth is not less than the bandwidth quota, then determining a first bandwidth (First BW) which can be granted to the recalibrating CBSD, wherein First BW=BW Quota−(Total BW−Asserted BW);

determining whether the determined first bandwidth is greater than zero;
  determining that the first bandwidth is not greater than zero, then transmit a grant request denial to the recalibrating CBSD;
  determining that the sum bandwidth is less than the bandwidth quota or determining that the first bandwidth is greater than zero, then selecting an alternate channel and determining a maximum transmit power level, and transmitting to the recalibrating CBSD the selected alternate channel and the determined maximum transmit power;
  transmitting, to the recalibrating CBSD, a grant termination terminating an authorized grant, of the recalibrating CBSD, for identified channel;
  recalculating a total bandwidth of the recalibrating CBSD accounting for the diminished bandwidth due to the grant termination;
  determining whether the total bandwidth is greater than the bandwidth quota; and
  determining that the total bandwidth is greater than the bandwidth quota, then transmitting, to the recalibrating CBSD, termination of at least one authorized grant of the recalibrating CBSD and redetermining the total bandwidth of the recalibrating CBSD.

11. An apparatus, comprising: processing circuitry configured to:
  receive a grant request (a) specifying a channel in shared frequency spectrum and (b) a maximum transmit power level at which a requesting general authorized access (GAA) citizens broadband radio service device (CBSD) desires to transmit in the specified channel, and transmitted by the requesting GAA CBSD;

identify each edge between a non-requesting GAA CBSD and the requesting GAA CBSD, wherein each non-requesting GAA CBSD is geographically located in a neighborhood centered around the requesting GAA CBSD;

determine whether there is at least one edge between the requesting GAA CBSD and at least one non-requesting GAA CBSD;

determine that there is the at least one edge between the requesting GAA CBSD and the at least one non-requesting GAA CBSD, then determine, for the requesting GAA CBSD, a bandwidth quota;

determine whether a total bandwidth (Total BW) assigned to the requesting GAA CBSD is greater than the bandwidth quota, wherein the total bandwidth assigned to the requesting GAA CBSD is a sum of (a) a bandwidth of each channel in which the requesting GAA CBSD is presently authorized to transmit, and (b) a bandwidth of a channel identified in the grant request;

determine that the total bandwidth assigned to the requesting GAA CBSD is not greater than the bandwidth quota, then determine (a) a channel, orthogonal or non-orthogonal if no orthogonal channels exist to channels in which each non-requesting GAA CBSD are presently authorized to transmit and/or (b) a maximum transmit power level for a determined channel, and transmit the determined channel and/or the determined maximum transmit power level to the requesting GAA CBSD;

determine whether the requesting GAA CBSD is marked as a recalibrating CBSD, wherein the recalibrating CBSD is a requesting GAA CBSD that has an edge with a former requesting GAA CBSD geographically located in the neighborhood centered around the requesting CBSD and wherein the former requesting GAA CBSD received authorization to transmit in a channel (a) in the shared frequency spectrum at a time between a prior executed Coordinated Periodic Activities among SASs (CPAS) and a next to be executed CPAS and (a) which overlaps a channel in which the requesting GAA CBSD is authorized to transmit prior to the requesting GAA CBSD transmitting its grant request;

determine that the requesting GAA CBSD is not a recalibrating CBSD, then if no free frequency spectrum is available, then diminish bandwidth allocated to the requesting GAA CBSD to equal the bandwidth quota, or if the free frequency spectrum is available, then, determine and transmit, to the requesting GAA CBSD, (a) a channel which is in the free frequency spectrum and/or (b) a maximum transmit power level for the determined channel for requested by the requesting GAA CBSD, wherein the free frequency spectrum means frequency spectrum which is orthogonal to frequency spectrum of any incumbent user(s), incumbent region(s), and any non-requesting GAA CBSD(s) which are geographically located in the neighborhood centered around the requesting GAA CBSD; and determine that the requesting GAA CBSD is a recalibrating CBSD, then (i) (a) determine a channel, orthogonal or non-orthogonal if no orthogonal channels exist to channels in which each non-requesting GAA CBSD are presently authorized to transmit, and then diminish bandwidth in the shared frequency spectrum in which the requesting GAA CBSD is presently authorized to transmit to equal the bandwidth quota, and/or (b) determine a maximum transmit power level for the determined channel, and (ii) transmit the determined channel and/or the determined maximum transmit power level to the requesting GAA CBSD;

wherein the requesting GAA CBSD is configured to transmit using the determined maximum transmit power level and/or the determined channel.

12. The apparatus of claim 11, wherein determine, for the requesting GAA CBSD, a bandwidth quota comprises:

determine a maximum transmit power level, of the requesting GAA CBSD, in each of Z channels, wherein the Z channels are channels in which the requesting GAA CBSD is not prohibited from transmitting by law, regulation, and/or standard;

identify M available channels, of the Z channels, which have a maximum transmit power level greater than a first power threshold level;

determine an aggregate bandwidth (AgBW) of the M available channels, wherein the aggregate bandwidth equals a bandwidth per channel multiplied by M;

determine a number, of each non-requesting GAA CBSD (NRC) that are authorized to transmit in the aggregate bandwidth of the M available channels, wherein each NRC is authorized to transmit in at least one channel which is orthogonal to the channel specified, in the grant request, by the requesting GAA CBSD; and determine AgBW/(NRC+1).

13. The apparatus of claim 11, wherein determining the bandwidth quota comprises determine a maximum transmit power level of requesting GAA CBSD in each of Z channels using a first modified iterative allocation process (IAP);

wherein determine (a) the channel, orthogonal or non-orthogonal if no orthogonal channels exist to the at least one channel in which each non-requesting GAA CBSD is presently authorized to transmit and/or (b) the maximum transmit power level for the determined channel, and transmit the determined channel and/or the determined maximum transmit power level to the requesting GAA CBSD comprises:

determine a K bandwidth (K BW), wherein $$K\ BW = BW\ Quota - (BW\ Requested\ by\ Requesting\ GAA\ CBSD + Total\ BW\ Assigned\ to\ Requesting\ GAA\ CBSD),$$

wherein K is an integer multiple of the bandwidth of each of the Z channels, the BW Quota is the determined bandwidth quota, the BW Requested by Requesting GAA CBSD is a sum of bandwidth of each channel requested by the requesting GAA CBSD in the received grant request, and Total BW Assigned to Requesting GAA CBSD is a sum of bandwidth of each channel for which the requesting GAA CBSD is presently authorized;

identify at least one channel with K bandwidth within a frequency spectrum of a channel requested by the requesting GAA CBSD;

determine whether at least one of the at least one channel with K bandwidth is within one of M available channels, wherein M available channels, of the Z channels, have a maximum transmit power level greater than a first power threshold level;

determine that none of the channels with K bandwidth is within one or more of the M available channels, then identify at least one channel with K bandwidth that is within one or more of the M available channels;

for each edge between the requesting GAA CBSD and a set of at least one non-requesting GAA CBSD in the neighborhood centered around the requesting GAA CBSD, determine whether each channel with a K bandwidth is within one or more of the M available channels is orthogonal to at least one channel of the set of at least one non-requesting GAA CBSD, in the neighborhood centered around the requesting GAA CBSD, that has been authorized to transmit;

determine that each channel with a K bandwidth is within one or more of the M available channels is not orthogonal to the channels of the non-requesting GAA CBSDs, in the neighborhood centered around the requesting GAA CBSD, that has been authorized to transmit, then, for each edge between the requesting GAA CBSD and a non-requesting GAA CBSD in the neighborhood centered around the requesting GAA CBSD, identify each channel, with a K bandwidth that is partially co-channel with a channel in which a non-requesting GAA CBSD is authorized to transmit, wherein partially co-channel means that at least two channels share a portion of a same frequency spectrum;

determine a maximum transmit power level for each identified channel, wherein the maximum transmit power level of each identified channel is a minimum value of a set of maximum transmit power levels comprising a maximum transmit power level of each Z channel;

select an identified channel that has a largest maximum transmit power;

classify the requesting GAA CBSD as an asserting CBSD and classifying the non-requesting GAA CBSD that is authorized to transmit in the selected identified channel as a recalibrating CBSD, wherein such classifications are cleared at the next to be executed CPAS;

determine that at least one channel with K bandwidth is within one or more of the M available channels, then, for each edge between the requesting GAA CBSD and a non-requesting GAA CBSD geographically located within the neighborhood centered around the requesting GAA CBSD, determine whether any channel with a K bandwidth is orthogonal to channel(s) in which the set of at least one non-requesting GAA CBSD, in the neighborhood centered around the requesting GAA CBSD and with which there is an edge, are authorized to transmit;

determine that at least one channel with a K bandwidth is within one or more of the M available channels is orthogonal to the channels of the non-requesting GAA CBSDs, in the neighborhood centered around the requesting GAA CBSD, that has been authorized to transmit, then selecting a channel with a K bandwidth having a largest maximum transmit power level;

using a second modified IAP, determine a maximum transmit power level for the selected identified channel with K bandwidth or the selected channel with K bandwidth;

determine whether the determined maximum transmit power level for the selected identified channel with K bandwidth or the selected channel with a K bandwidth is greater than a second power threshold level;

determine that the determined maximum transmit power level for the selected identified channel with K bandwidth or the selected channel with a K bandwidth is greater than the second power threshold level, then transmit, to the requesting GAA CBSD, the maximum transmit power level determined using the second IAP, and the selected channel or the selected identified channel corresponding to the maximum transmit power level, and terminate the grant request; and determine that the determined maximum transmit power level for the selected identified channel with K bandwidth or the selected channel with a K bandwidth is not greater than the second power threshold level, then transmit, to the requesting GAA CBSD, the maximum transmit power level determined using the first modified IAP and the selected channel, and terminate the grant.

14. The apparatus of claim 11, where if no free frequency spectrum is available, then diminish bandwidth allocated to the requesting GAA CBSD to equal the bandwidth quota, or if the free frequency spectrum is available, then, determine and transmit, to the requesting GAA CBSD, (a) the channel which is in the free frequency spectrum and/or (b) the maximum transmit power level for the determined channel for the requesting GAA CBSD comprises:

determine a Q bandwidth which is a minimum of a bandwidth threshold and a Y bandwidth, wherein the Y bandwidth is a bandwidth of the channel requested in the grant request by the requesting GAA CBSD;

identify a first set of at least one channel with Q bandwidth within the at least one channel requested in such grant request from the requesting GAA CBSD;

identify a second set of at least one channel with Q bandwidth in the free frequency spectrum;

identify any channel which is an element in both the first set of at least one channel and the second set of at least one channel;

determine whether at least one channel has been identified as an element of the first set of at least one channel and the second set of at least one channel;

determine that the at least one channel has been identified as an element of the first set of at least one channel and the second set of at least one channel, then determine whether the Q bandwidth is less than the Y bandwidth;

determine that the Q bandwidth is not less than the Y bandwidth, then transmit, the requesting GAA CBSD, authorization to transmit on the channel specified in the grant request and at the maximum transmit power level requested by the requesting GAA CBSD;

determine that the Q bandwidth is less than Y bandwidth, then select a channel from the identified channels which are elements in both the first set and the second set, transmitting, to the requesting GAA CBSD, an authorization to transmit on the selected channel and at the maximum transmit power level requested by the requesting GAA CBSD, and transmitting, to the requesting GAA CBSD, a termination of the grant request of the requesting GAA CBSD;

determine that the at least one channel has not been identified as an element of the first set of at least one channel and the second set of at least one channel, then determine whether the second set of at least one channel includes at least one element;

determine that the second set includes at least one element, then select a channel from the second set and transmit, to the requesting GAA CBSD, authorization to transmit on the selected channel and at the maximum transmit power level requested by the requesting GAA CBSD and transmit, to the requesting GAA CBSD, a termination of the grant request of the requesting GAA CBSD; and determine that the second set does not includes at least one element, then transmit, to the requesting GAA CBSD, a termination of at least one authorized grant of the requesting GAA CBSD.

15. The apparatus of claim 11, wherein (i) (a) determine the channel, orthogonal or non-orthogonal if no orthogonal channels exist to channels in which each non-requesting GAA CBSD are presently authorized to transmit, and then diminishing bandwidth in the shared spectrum in which the requesting GAA CBSD is presently authorized to transmit to equal the bandwidth quota, and/or (b) determine the maximum transmit power level for the determined channel, and (ii) transmit the determined channel and/or the determined maximum transmit power level to the requesting GAA CBSD comprises:
- identify a channel in which the recalibrating CBSD is authorized to transmit and which overlaps a same or another channel in which an asserting CBSD is authorized to transmit, wherein overlap means that at least two channels share common frequency spectrum;
- determine whether a sum bandwidth (Sum BW) is less than the bandwidth quota, wherein Sum BW=Total BW−Asserted BW+Requested BW, wherein the requesting GAA CBSD has been marked a recalibrating CBSD, the asserted bandwidth (Asserted BW) means a bandwidth of frequency spectrum overlapping a channel of an asserting CBSD and a channel of the recalibrating CBSD; interference from the asserting CBSD to the requesting CBSD in overlapping frequency spectrum gave rise to the requesting CBSD to issue a grant request prior to the next to be executed CPAS, and requested bandwidth (Requested BW) means bandwidth requested by the requesting CBSD in its grant request;
- determine that the sum bandwidth is not less than the bandwidth quota, then determining a first bandwidth (First BW) which can be granted to the recalibrating CBSD, wherein First BW=BW Quota−(Total BW−Asserted BW);

- determine whether the determined first bandwidth is greater than zero;
- determine that the first bandwidth is not greater than zero, then transmit a grant request denial to the recalibrating CBSD;
- determine that the sum bandwidth is less than the bandwidth quota or determine that the first bandwidth is greater than zero, then select an alternate channel and determining a maximum transmit power level, and transmit to the recalibrating CBSD the selected alternate channel and the determined maximum transmit power;
- transmit, to the recalibrating CBSD, a grant termination terminating an authorized grant, of the recalibrating CBSD, for identified channel;
- recalculate a total bandwidth of the recalibrating CBSD accounting for the diminished bandwidth due to the grant termination;
- determine whether the total bandwidth is greater than the bandwidth quota; and
- determine that the total bandwidth is greater than the bandwidth quota, then transmit, to the recalibrating CBSD, termination of at least one authorized grant of the recalibrating CBSD and redetermine the total bandwidth of the recalibrating CBSD.

* * * * *